United States Patent
Aziz et al.

(10) Patent No.: US 6,597,956 B1
(45) Date of Patent: Jul. 22, 2003

(54) METHOD AND APPARATUS FOR CONTROLLING AN EXTENSIBLE COMPUTING SYSTEM

(75) Inventors: Ashar Aziz, Fremont, CA (US); Tom Markson, San Mateo, CA (US); Martin Patterson, Mountain View, CA (US); Mark Gray, Mountain View, CA (US)

(73) Assignee: Terraspring, Inc., Fremont, CA (US)

( * ) Notice: Subject to any disclaimer, the term of this patent is extended or adjusted under 35 U.S.C. 154(b) by 202 days.

(21) Appl. No.: 09/630,440

(22) Filed: Aug. 2, 2000

Related U.S. Application Data

(63) Continuation-in-part of application No. 09/502,170, filed on Feb. 11, 2000
(60) Provisional application No. 60/213,090, filed on Jun. 20, 2000, and provisional application No. 60/150,394, filed on Aug. 23, 1999.

(51) Int. Cl.[7] ............................................. G05B 19/18
(52) U.S. Cl. .......................... 700/3; 700/99; 700/101; 709/104; 709/105; 709/208; 709/209; 712/31
(58) Field of Search ........................... 700/3, 99, 101; 709/104, 105, 208, 209; 712/31

(56) References Cited

U.S. PATENT DOCUMENTS

| | | | |
|---|---|---|---|
| 4,591,967 A | * 5/1986 | Mattes et al. | 700/3 |
| 5,163,130 A | 11/1992 | Hullot | |
| 5,504,670 A | * 4/1996 | Barth et al. | 709/104 |
| 5,574,914 A | 11/1996 | Hancock et al. | |
| 5,590,284 A | * 12/1996 | Crosetto | 712/31 |
| 5,659,786 A | 8/1997 | George et al. | |
| 5,951,683 A | * 9/1999 | Yuuki et al. | 709/208 |
| 6,446,141 B1 | * 9/2002 | Nolan et al. | 709/203 |

FOREIGN PATENT DOCUMENTS

| | | |
|---|---|---|
| EP | 0 262 750 A2 | 4/1988 |
| EP | 0262750 A2 | 4/1988 |
| EP | 0 750 256 A2 | 12/1996 |
| EP | 0 905 621 A1 | 3/1999 |
| EP | 0917056 A2 | 5/1999 |
| EP | 0935200 A1 | 8/1999 |
| WO | WO 00/29954 A1 | 5/2000 |

OTHER PUBLICATIONS

Rob Short, et al., "Windows NT Clusters for Availability and Scalability," 1997 IEEE, pp. 8–13.
Elliotte Rusty Harold, "XML: Extensible Markup Language," 1998, pp. 1–431.
Radek Vingralek, et al., "Snowball: Scalable Storage on Networks of Workstations with Balanced Load," pp. 117–156, Distributed and Parallel Databases, vol. 6, No. 2, Apr. 1998, XP–002162201.
Armando Fox, et al., "Cluster–Based Scalable Network Services," pp. 78–91, Operating Systems Review (SIGOPS), US, ACM Headquarter, New York, vol. 31, No. 5, Dec. 1, 1997, XP–000771023.

\* cited by examiner

*Primary Examiner*—Ramesh Patel
*Assistant Examiner*—Thomas Pham
(74) *Attorney, Agent, or Firm*—Hickman Palermo Truong & Becker LLP; Edward A. Becker

(57) ABSTRACT

A Virtual Server Farm (VSF) is created out of a wide scale computing fabric ("Computing Grid") which is physically constructed once and then logically divided up into VSFs for various organizations on demand. Allocation and control of the elements in the VSF is performed by a control plane connected to all computing, networking, and storage elements in the computing grid through special control ports. The control plane is comprised of a control mechanism hierarchy that includes one or more master control process mechanisms communicatively coupled to one or more slave control process mechanisms. The one or more master control process mechanisms instruct the slave control process mechanisms to establish VSFs by selecting subsets of processing and storage resources.

45 Claims, 18 Drawing Sheets

METHOD AND APPARATUS FOR CONTROLLING AN EXTENSIBLE COMPUTING SYSTEM

"This application is a Continuation-In-Part of application Ser. No. 09/502,170 filed Feb. 11, 2000, and claims priority from U.S. Provisional Patent Application No. 60/150,394, filed on Aug. 23, 1999, entitled EXTENSIBLE COMPUTING SYSTEM, and from U.S. Provisional Patent Application No. 60/213,090, filed on Jun. 20, 2000, entitled CONTROL PLANE FUNCTIONAL DESIGN, the content of which are hereby incorporated by reference in their entirety."

FIELD OF THE INVENTION

The present invention relates generally to data processing. The invention relates more specifically to a method and apparatus for controlling a computing grid.

BACKGROUND OF THE INVENTION

Builders of Web sites and other computer systems today are faced with many challenging systems planning issues. These issues include capacity planning, site availability and site security. Accomplishing these objectives requires finding and hiring trained personnel capable of engineering and operating a site, which may be potentially large and complicated. This has proven to be difficult for many organizations because designing, constructing and operating large sites is often outside their core business.

One approach has been to host an enterprise Web site at a third party site, co-located with other Web sites of other enterprises. Such outsourcing facilities are currently available from companies such as Exodus, AboveNet, GlobalCenter, etc. These facilities provide physical space and redundant network and power facilities shared by multiple customers.

Although outsourcing web site hosting greatly reduces the task of establishing and maintaining a web site, it does not relieve a company of all of the problems associated with maintaining a web site. Companies must still perform many tasks relating to their computing infrastructure in the course of building, operating and growing their facilities. Information technology managers of the enterprises hosted at such facilities remain responsible for manually selecting, installing, configuring, and maintaining their own computing equipment at the facilities. The managers must still confront difficult issues such as resource planning and handling peak capacity. Specifically, managers must estimate resource demands and request resources from the outsourcing company to handle the demands. Many managers ensure sufficient capacity by requesting substantially more resources than are needed to provide a cushion against unexpected peak demands. Unfortunately, this often results in significant amounts of unused capacity that increases companies' overhead for hosting their web sites.

Even when outsourcing companies also provide complete computing facilities including servers, software and power facilities, the facilities are no easier to scale and grow for the outsourcing company, because growth involves the same manual and error-prone administrative steps. In addition, problems remain with capacity planning for unexpected peak demand. In this situation, the outsourcing companies often maintain significant amounts of unused capacity.

Further, Web sites managed by outsourcing companies often have different requirements. For example, some companies may require the ability to independently administer and control their Web sites. Other companies may require a particular type or level of security that isolates their Web sites from all other sites that are co-located at an outsourcing company. As another example, some companies may require a secure connection to an enterprise Intranet located elsewhere.

Also, various Web sites differ in internal topology. Some sites simply comprise a row of Web servers that are load balanced by a Web load balancer. Suitable load balancers are Local Director from Cisco Systems, Inc., BigIP from F5Labs, Web Director from Alteon, etc. Other sites may be constructed in a multi-tier fashion, whereby a row of Web servers handle Hypertext Transfer Protocol (HTTP) requests, but the bulk of the application logic is implemented in separate application servers. These application servers in turn may need to be connected back to a tier of database servers.

Some of these different configuration scenarios are shown in FIG. 1A, FIG. 1B, and FIG. 1C. FIG. 1A is a block diagram of a simple Web site, comprising a single computing element or machine 100 that includes a CPU 102 and disk 104. Machine 100 is coupled to the global, packet-switched data network known as the Internet 106, or to another network. Machine 100 may be housed in a co-location service of the type described above.

FIG. 1B is a block diagram of a 1-tier Web server farm 110 comprising a plurality of Web servers WSA, WSB, WSC. Each of the Web servers is coupled to a load-balancer 112 that is coupled to Internet 106. The load balancer divides the traffic between the servers to maintain a balanced processing load on each server. Load balancer 112 may also include or may be coupled to a firewall for protecting the Web servers from unauthorized traffic.

FIG. 1C shows a 3-tier server farm 120 comprising a tier of Web servers W1, W2, etc., a tier of application servers A1, A2, etc., and a tier of database servers D1, D2, etc. The Web servers are provided for handling HTTP requests. The application servers execute the bulk of the application logic. The database servers execute database management system (DBMS) software.

Given the diversity in topology of the kinds of Web sites that need to be constructed and the varying requirements of the corresponding companies, it may appear that the only way to construct large-scale Web sites is to physically custom build each site. Indeed, this is the conventional approach. Many organizations are separately struggling with the same issues, and custom building each Web site from scratch. This is inefficient and involves a significant amount of duplicate work at different enterprises.

Still another problem with the conventional approach is resource and capacity planning. A Web site may receive vastly different levels of traffic on different days or at different hours within each day. At peak traffic times, the Web site hardware or software may be unable to respond to requests in a reasonable time because it is overloaded. At other times, the Web site hardware or software may have excess capacity and be underutilized. In the conventional approach, finding a balance between having sufficient hardware and software to handle peak traffic, without incurring excessive costs or having over-capacity, is a difficult problem. Many Web sites never find the right balance and chronically suffer from under-capacity or excess capacity.

Yet another problem is failure induced by human error. A great potential hazard present in the current approach of using manually constructed server farms is that human error in configuring a new server into a live server farm can cause the server farm to malfunction, possibly resulting in loss of service to users of that Web site.

Based on the foregoing, there is a clear need in this field for improved methods and apparatuses for providing a computing system that is instantly and easily extensible on demand without requiring custom construction.

There is also a need for a computing system that supports creation of multiple segregated processing nodes, each of which can be expanded or collapsed as needed to account for changes in traffic throughput.

There is a further need for a method and apparatus for controlling such an extensible computing system and its constituent segregated processing nodes. Other needs will become apparent from the disclosure provided herein.

SUMMARY OF THE INVENTION

According to one aspect of the invention, the foregoing needs, and other needs and that will become apparent from the following description, are achieved by a method and apparatus for controlling and managing a highly scalable, highly available and secure data processing sites, based on a wide scale computing fabric ("computing grid"). The computing grid is physically constructed once, and then logically divided up for various organizations on demand. The computing grid comprises a large plurality of computing elements that are coupled to one or more VLAN switches and to one or more storage area network (SAN) switches. A plurality of storage devices are coupled to the SAN switches and may be selectively coupled to one or more of the computing elements through appropriate switching logic and commands. One port of the VLAN switch is coupled to an external network, such as the Internet. A supervisory mechanism, layer, machine or process is coupled to the VLAN switches and SAN switches.

Initially, all storage devices and computing elements are assigned to Idle Pools. Under program control, the supervisory mechanism dynamically configures the VLAN switches and SAN switches to couple their ports to one or more computing elements and storage devices. As a result, such elements and devices are logically removed from the Idle Pools and become part of one or more virtual server farms (VSFs) or instant data centers (IDCs). Each VSF computing element is pointed to or otherwise associated with a storage device that contains a boot image usable by the computing element for bootstrap operation and production execution.

According to one aspect of the invention, the supervisory layer is a control plane comprised of a control mechanism hierarchy that includes one or more master control process mechanisms communicatively coupled to one or more slave control process mechanisms. The one or more master control process mechanisms allocate and de-allocate slave control process mechanisms based upon slave control process mechanism loading. The one or more master control process mechanisms instruct the slave control process mechanisms to establish IDCs by selecting subsets of processing and storage resources. The one or more master control process mechanisms perform periodic health checks on the slave control process mechanisms. Non-responsive or failed slave control mechanisms are restarted. Additional slave control mechanisms are initiated to replace slave control mechanisms that cannot be restarted. The slave control mechanisms perform periodic health checks on the master control mechanisms. When a master slave control process mechanism has failed, a slave control process mechanism is elected to be a new master control process mechanism to replace the failed master control process mechanism.

Physically constructing the computing grid once, and securely and dynamically allocating portions of the computing grid to various organizations on demand achieve economies of scale that are difficult to achieve when creating a custom build of each site.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1A:
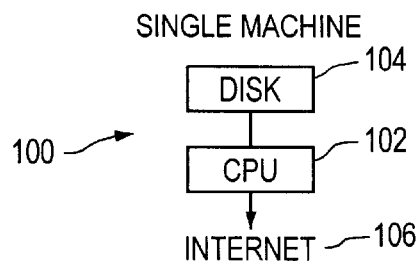
FIG. 1A is a block diagram of a simple Web site having a single computing element topology.
Figure 1B:
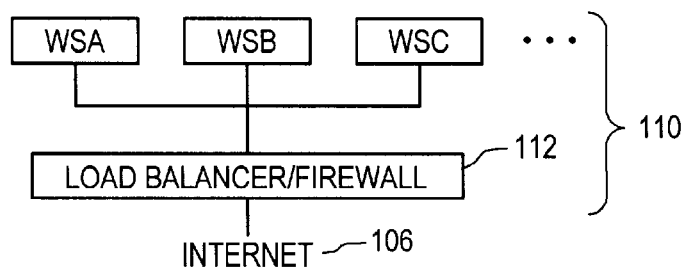
FIG. 1B is a block diagram of a one-tier Web server farm.
Figure 1C:
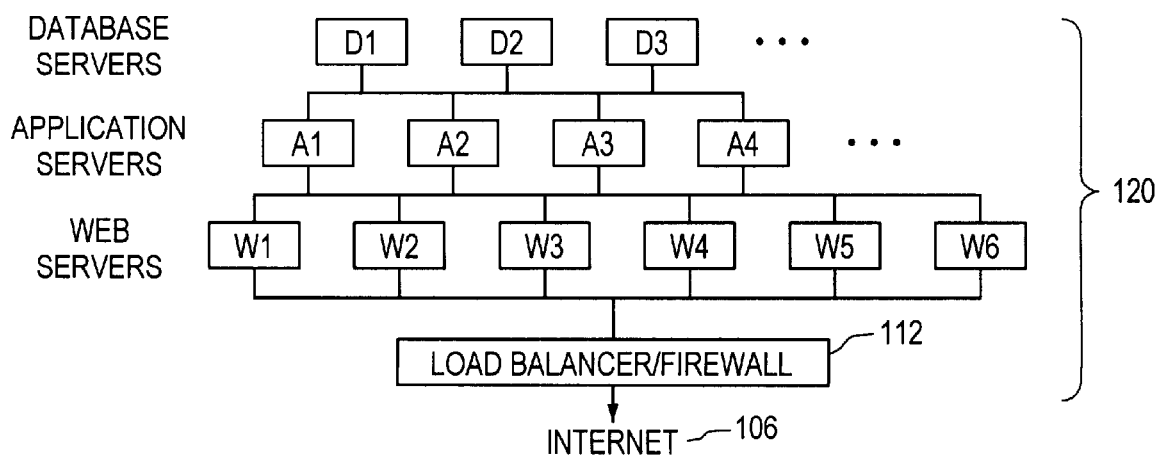
FIG. 1C is a block diagram of a three-tier Web server farm.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

VIRTUAL SERVER FARM (VSF)

According to one embodiment, a wide scale computing fabric ("computing grid") is provided. The computing grid may be physically constructed once, and then logically partitioned on demand. A part of the computing grid is allocated to each of a plurality of enterprises or organizations. Each organization's logical portion of the computing grid is referred to as a Virtual Server Farm (VSF). Each organization retains independent administrative control of its VSF. Each VSF can change dynamically in terms of number of CPUs, storage capacity and disk and network bandwidth based on real-time demands placed on the server farm or other factors. Each VSF is secure from every other organization's VSF, even though they are all logically created out of the same physical computing grid. A VSF can be connected back to an Intranet using either a private leased line or a Virtual Private Network (VPN), without exposing the Intranet to other organizations' VSFs.

An organization can access only the data and computing elements in the portion of the computing grid allocated to it, that is, in its VSF, even though it may exercise full (e.g. super-user or root) administrative access to these computers and can observe all traffic on Local Area Networks (LANs) to which these computers are connected. According to one embodiment, this is accomplished using a dynamic firewalling scheme, where the security perimeter of the VSF expands and shrinks dynamically. Each VSF can be used to host the content and applications of an organization that may be accessed via the Internet, Intranet or Extranet.

Configuration and control of the computing elements and their associated networking and storage elements is performed by a supervisory mechanism that is not directly accessible through any of the computing elements in the computing grid. For convenience, in this document the supervisory mechanism is referred to generally as a control plane and may comprise one or more processors or a network of processors. The supervisory mechanism may comprise a Supervisor, Controller, etc. Other approaches may be used, as described herein.

The control plane is implemented on a completely independent set of computing elements assigned for supervisory purposes, such as one or more servers that may be interconnected in a network or by other means. The control plane performs control actions on the computing, networking and storage elements of the computing grid through special control ports or interfaces of the networking and storage elements in the grid. The control plane provides a physical interface to switching elements of the system, monitors loads of computing elements in the system, and provides administrative and management functions using a graphical user interface or other suitable user interface.

Computers used to implement the control plane are logically invisible to computers in the computing grid (and therefore in any specific VSF) and cannot be attacked or subverted in any way via elements in the computing grid or from external computers. Only the control plane has physical connections to the control ports on devices in the computing grid, which controls membership in a particular VSF. The devices in the computing can be configured only through these special control ports, and therefore computing elements in the computing grid are unable to change their security perimeter or access storage or computing devices which they are not authorized to do.

Thus, a VSF allows organizations to work with computing facilities that appear to comprise a private server farm, dynamically created out of a large-scale shared computing infrastructure, namely the computing grid. A control plane coupled with the computing architecture described herein provides a private server farm whose privacy and integrity is protected through access control mechanisms implemented in the hardware of the devices of the computing grid.

The control plane controls the internal topology of each VSF. The control plane can take the basic interconnection of computers, network switches and storage network switches described herein and use them to create a variety of server farm configurations. These include but are not limited to, single-tier Web server farms front-ended by a load balancer, as well as multi-tier configurations, where a Web server talks to an application server, which in turn talks to a database server. A variety of load balancing, multi-tiering and firewalling configurations are possible.

THE COMPUTING GRID

The computing grid may exist in a single location or may be distributed over a wide area. First this document describes the computing grid in the context of a single building-sized network, composed purely of local area technologies. Then the document describes the case where the computing grid is distributed over a wide area network (WAN).

Figure 2:
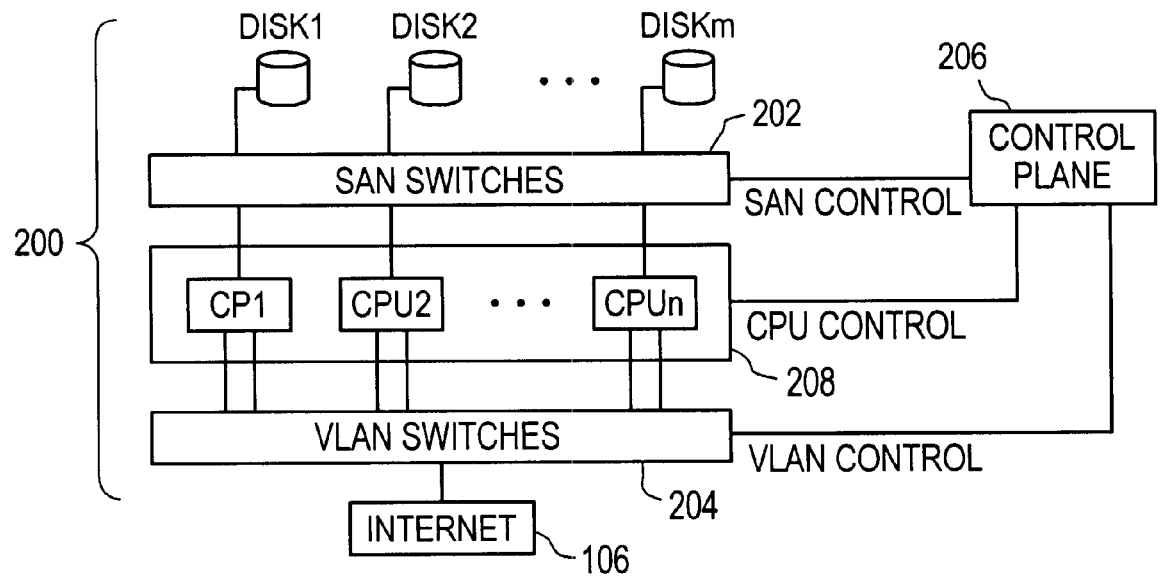
FIG. 2 is a block diagram of one configuration of an extensible computing system 200 that includes a local computing grid.

FIG. 2 is a block diagram of one configuration of an extensible computing system 200 that includes a local computing grid 208. In this document "extensible" generally means that the system is flexible and scalable, having the capability to provide increased or decreased computing power to a particular enterprise or user upon demand. The local computing grid 208 is composed of a large number of computing elements CPU1, CPU2, . . . CPUn. In an exemplary embodiment, there may be 10,000 computing elements, or more. These computing elements do not contain or store any long-lived per-element state information, and therefore may be configured without persistent or non-volatile storage such as a local disk. Instead, all long lived state information is stored separate from the computing elements, on disks DISK1, DISK2, . . . DISKn that are coupled to the computing elements via a Storage Area Network (SAN) comprising one or more SAN Switches 202. Examples of suitable SAN switches are commercially available from Brocade and Excel.

All of the computing elements are interconnected to each other through one or more VLAN switches 204 which can be divided up into Virtual LANs (VLANs). The VLAN switches 204 are coupled to the Internet 106. In general a computing element contains one or two network interfaces connected to the VLAN switch. For the sake of simplicity, in FIG. 2 all nodes are shown with two network interfaces, although some may have less or more network interfaces. Many commercial vendors now provide switches supporting VLAN functionality. For example, suitable VLAN switches are commercially available from Cisco Systems, Inc. and Xtreme Networks. Similarly there are a large number of commercially available products to construct SANs, including Fibre Channel switches, SCSI-to-Fibre-Channel bridging devices, and Network Attached Storage (NAS) devices.

Control plane 206 is coupled by a SAN Control path, CPU Control path, and VLAN Control path to SAN switches 202, CPUs CPU1, CPU2, CPUn, and VLAN Switches 204, respectively.

Each VSF is composed of a set of VLANs, a set of computing elements that are attached to the VLANs, and a subset of the storage available on the SAN that is coupled to the set of computing elements. The subset of the storage available on the SAN is referred to as a SAN Zone and is protected by the SAN hardware from access from computing elements that are part of other SAN zones. Preferably, VLANs that provide non-forgeable port identifiers are used to prevent one customer or end user from obtaining access to VSF resources of another customer or end user.

Figure 3:
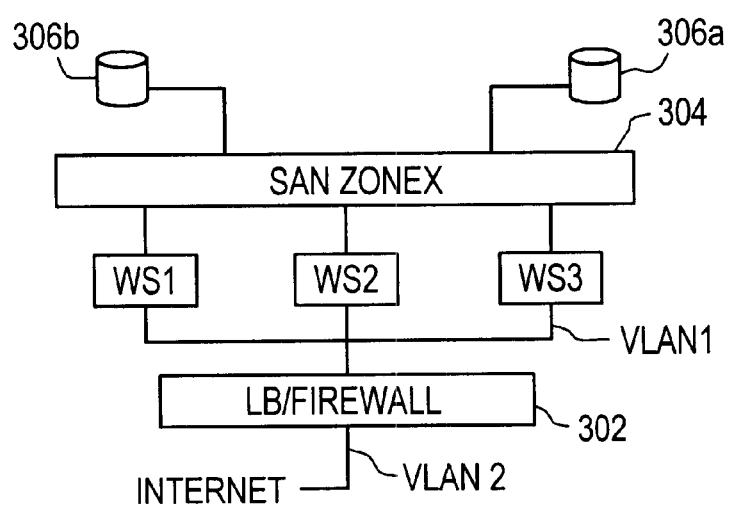
FIG. 3 is a block diagram of an exemplary virtual server farm featuring a SAN Zone.

FIG. 3 is a block diagram of an exemplary virtual server farm featuring a SAN Zone. A plurality of Web servers WS1, WS2, etc., are coupled by a first VLAN (VLAN1) to a load balancer (LB)/firewall 302. A second VLAN (VLAN2) couples the Internet 106 to the load balancer (LB)/firewall 302. Each of the Web servers may be selected from among CPU1, CPU2, etc., using mechanisms described further herein. The Web servers are coupled to a SAN Zone 304, which is coupled to one or more storage devices 306a, 306b.

At any given point in time, a computing element in the computing grid, such as CPU1 of FIG. 2, is only connected to the set of VLANs and the SAN zone(s) associated with a single VSF. A VSF typically is not shared among different organizations. The subset of storage on the SAN that belongs to a single SAN zone, and the set of VLANs associated with it and the computing elements on these VLANs define a VSF.

By controlling the membership of a VLAN and the membership of a SAN zone, control plane enforces a logical partitioning of the computing grid into multiple VSFs. Members of one VSF cannot access the computing or storage resources of another VSF. Such access restrictions are enforced at the hardware level by the VLAN switches, and by port-level access control mechanisms (e.g., zoning) of SAN hardware such as Fibre Channel switches and edge devices such as SCSI to Fibre Channel bridging hardware. Computing elements that form part of the computing grid are not physically connected to the control ports or interfaces of the VLAN switches and the SAN switches, and therefore cannot control the membership of the VLANs or SAN zones. Accordingly, the computing elements of the computing grid cannot access computing elements not located in the VSF in which they are contained.

Only the computing elements that run the control plane are physically connected to the control ports or interface of the devices in the grid. Devices in the computing grid (computers, SAN switches and VLAN switches) can only be configured through such control ports or interfaces. This provides a simple yet highly secure means of enforcing the dynamic partitioning of the computing grid into multiple VSFs.

Each computing element in a VSF is replaceable by any other computing element. The number of computing elements, VLANs and SAN zones associated with a given VSF ay change over time under control of the control plane.

In one embodiment, the computing grid includes an Idle Pool that comprises large number of computing elements that are kept in reserve. Computing elements from the Idle Pool may be assigned to a particular VSF for reasons such as increasing the CPU or memory capacity available to that VSF, or to deal with failures of a particular computing element in a VSF. When the computing elements are configured as Web servers, the Idle Pool serves as a large "shock absorber" for varying or "bursty" Web traffic loads and related peak processing loads.

The Idle Pool is shared between many different organizations, and therefore it provides economies of scale, since no single organization has to pay for the entire cost of the Idle Pool. Different organizations can obtain computing elements from the Idle Pool at different times in the day, as needed, thereby enabling each VSF to grow when required and shrink when traffic falls down to normal. If many different organizations continue to peak at the same time and thereby potentially exhaust the capacity of the Idle Pool, the Idle Pool can be increased by adding more CPUs and storage elements to it (scalability). The capacity of the Idle Pool is engineered so as to greatly reduce the probability that, in steady state, a particular VSF may not be able to obtain an additional computing element from the Idle Pool when it needs to.

Figure 4A:
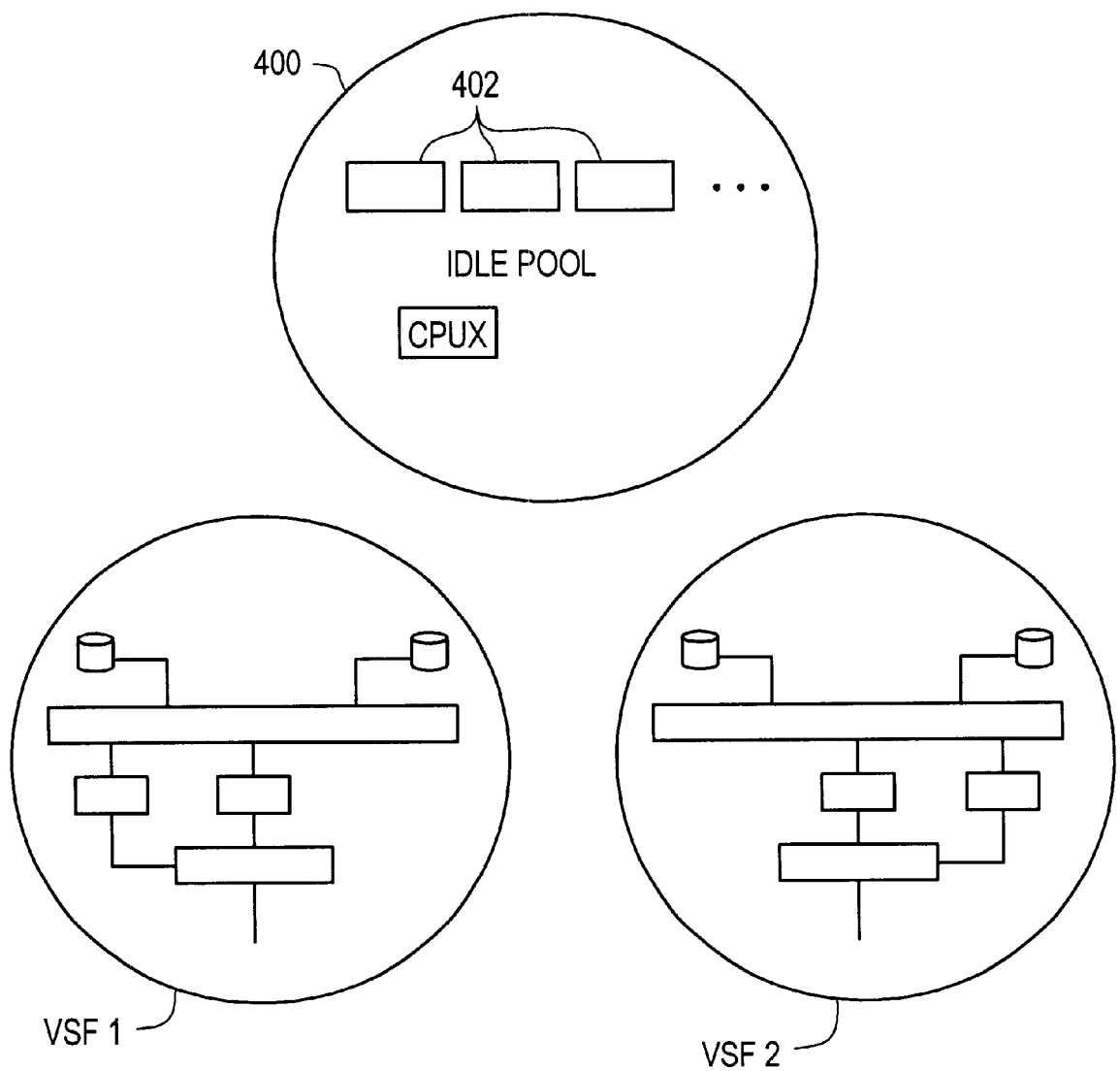
FIG. 4A, FIG. 4B, FIG. 4C, and FIG. 4D are block diagrams showing successive steps involved in adding a computing element and removing element from a virtual server farm.
Figure 4B:
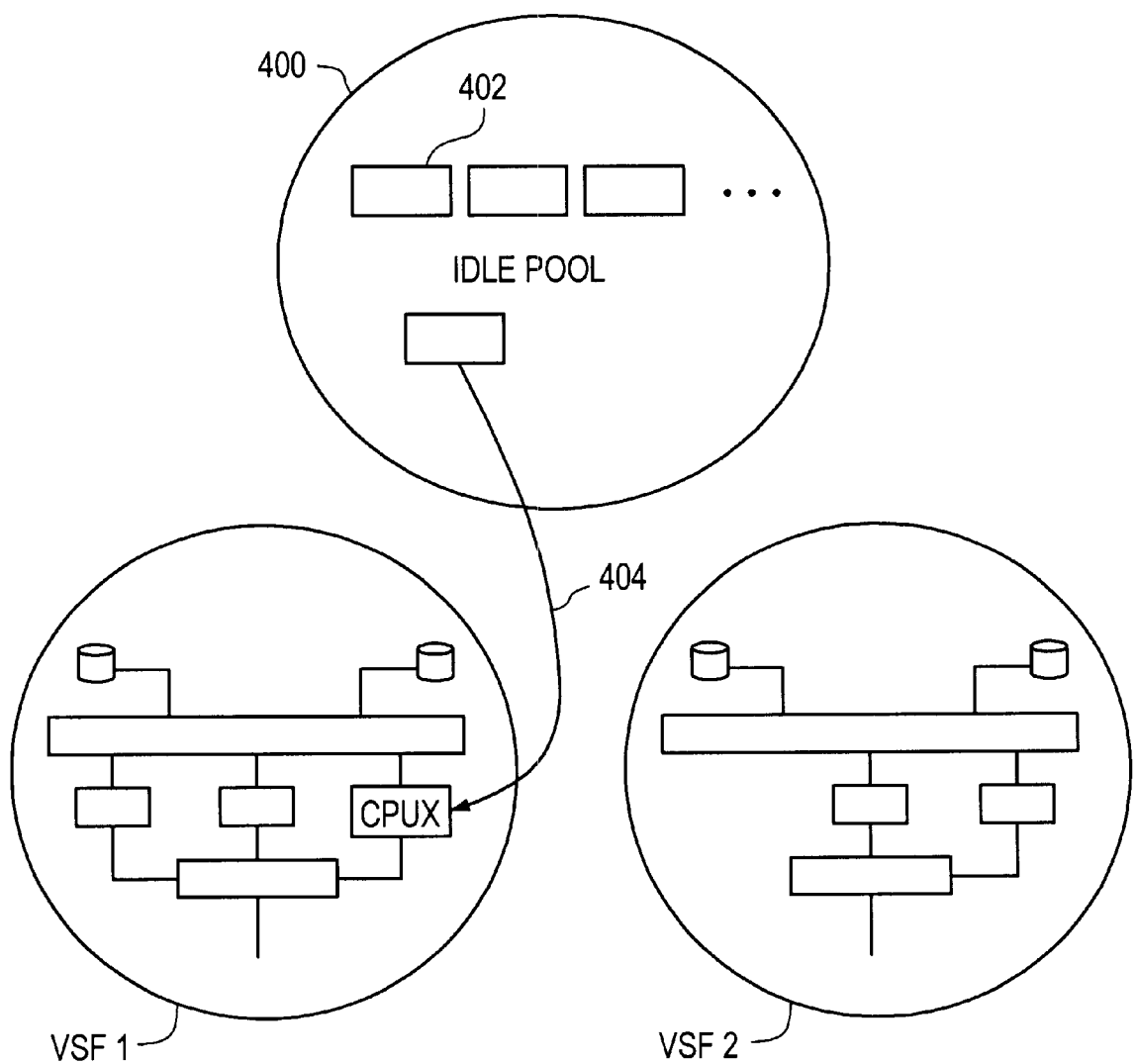

FIG. 4A, FIG. 4B, FIG. 4C, and FIG. 4D are block diagrams showing successive steps involved in moving a computing element in and out of the Idle Pool. Referring first to FIG. 4A, assume that the control plane has logically connected elements of the computing grid into first and second VSFs labeled VSF1, VSF2. Idle Pool 400 comprises a plurality of CPUs 402, one of which is labeled CPUX. In FIG. 4B, VSF1 has developed a need for an additional computing element. Accordingly, the control plane moves CPUX from Idle Pool 400 to VSF1, as indicated by path 404.

Figure 4C:
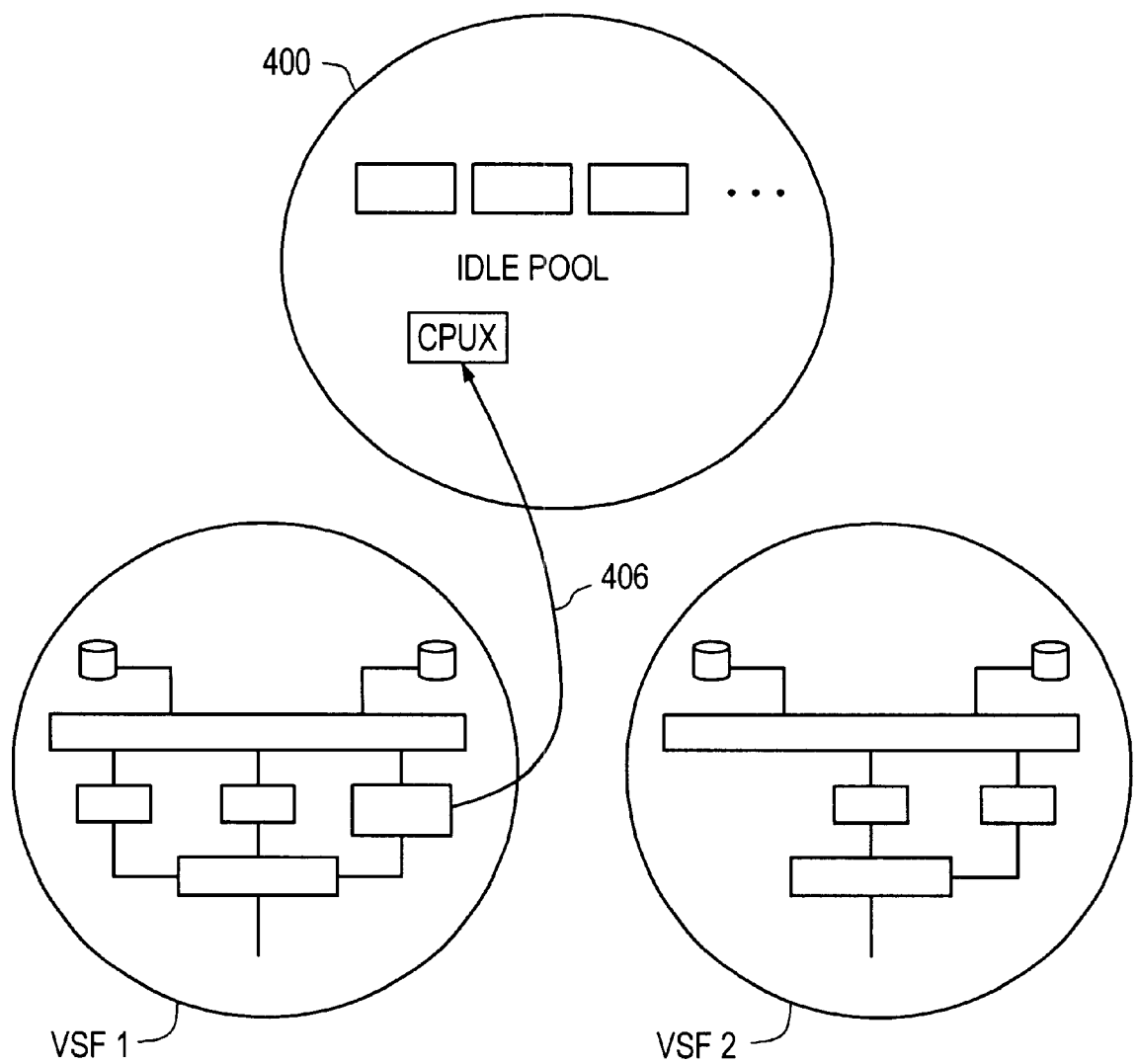
Figure 4D:
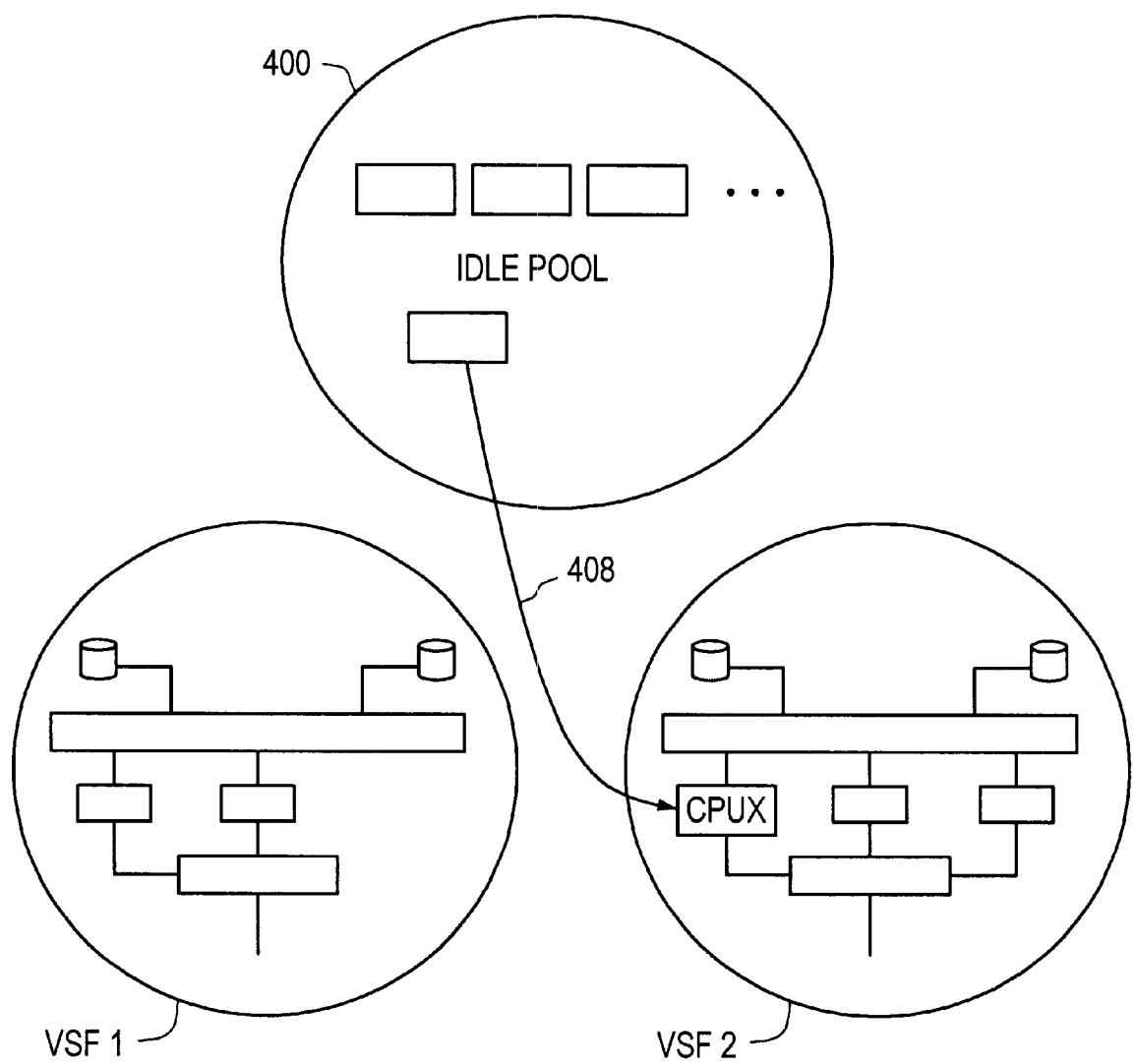

In FIG. 4C, VSF1 no longer needs CPUX, and therefore the control plane moves CPUX out of VSF1 and back into the Idle Pool 400. In FIG. 4D, VSF2 has developed a need for an additional computing element. Accordingly, the control plane moves CPUX from the Idle Pool 400 to VSF2. Thus, over the course of time, as traffic conditions change, a single computing element may belong to the Idle Pool (FIG. 4A), then be assigned to a particular VSF (FIG. 4B), then be placed back in the Idle Pool (FIG. 4C), and then belong to another VSF (FIG. 4D).

At each one of these stages, the control plane configures the LAN switches and SAN switches associated with that computing element to be part of the VLANs and SAN zones associated with a particular VSF (or the Idle Pool). According to one embodiment, in between each transition, the computing element is powered down or rebooted. When the computing element is powered back up, the computing element views a different portion of storage zone on the SAN. In particular, the computing element views a portion of storage zone on the SAN that includes a bootable image of an operating system (e.g., Linux, NT, Solaris, etc.). The storage zone also includes a data portion that is specific to each organization (e.g., files associated with a Web server, database partitions, etc.). The computing element is also part of another VLAN which is part of the VLAN set of another VSF, so it can access CPUs, SAN storage devices and NAS devices associated with the VLANs of the VSF into which it has been transitioned.

In a preferred embodiment, the storage zones include a plurality of pre-defined logical blueprints that are associated with roles that may be assumed by the computing elements. Initially, no computing element is dedicated to any particular role or task such as Web server, application server, database server, etc. The role of the computing element is acquired from one of a plurality of pre-defined, stored blueprints, each of which defines a boot image for the computing elements that are associated with that role. The blueprints may be stored in the form of a file, a database table, or any other storage format that can associate a boot image location with a role.

Thus, the movements of CPUX in FIG. 4A, FIG. 4B, FIG. 4C, FIG. 4D are logical, not physical, and are accomplished by re-configuring VLAN switches and SAN Zones under control of The control plane. Further, each computing element in the computing grid initially is essentially fungible, and assumes a specific processing role only after it is connected in a virtual server farm and loads software from a boot image. No computing element is dedicated to any particular role or task such as Web server, application server, database server, etc. The role of the computing element is acquired from one of a plurality of predefined, stored blueprints, each of which is associated with a role, each of which defines a boot image for the computing elements that are associated with that role.

Since there is no long-lived state information stored in any given computing element (such as a local disk), nodes are easily moved between different VSFs, and can run completely different OS and application software. This also makes each computing element highly replaceable, in case of planned or unplanned downtime.

A particular computing element may perform different roles as it is brought into and out of various VSFs. For example, a computing element may act as a Web server in one VSF, and when it is brought into a different VSF, it may be a database server, a Web load balancer, a Firewall, etc. It may also successively boot and run different operating systems such as Linux, NT or Solaris in different VSFs. Thus, each computing element in the computing grid is fungible, and has no static role assigned to it. Accordingly, the entire reserve capacity of the computing grid can be used to provide any of the services required by any VSF. This provides a high degree of availability and reliability to the services provided by a single VSF, because each server performing a particular service has potentially thousands of back-up servers able to provide the same service.

Further, the large reserve capacity of the computing grid can provide both dynamic load balancing properties, as well as high processor availability. This capability is enabled by the unique combination of diskless computing elements interconnected via VLANs, and connected to a configurable zone of storage devices via a SAN, all controlled in real-time by the control plane. Every computing element can act in the role of any required server in any VSF, and can connect to any logical partition of any disk in the SAN. When the grid requires more computing power or disk capacity, computing elements or disk storage is manually added to the idle pool, which may decrease over time as more organizations are provided VSF services. No manual intervention is required in order to increase the number of CPUs, network and disk bandwidth and storage available to a VSF. All such resources are allocated on demand from CPU, network and disk resources available in the Idle Pool by the control plane.

A particular VSF is not subjected to manual reconfiguration. Only the computing elements in the idle pool are manually configured into the computing grid. As a result, a great potential hazard present in current manually constructed server farms is removed. The possibility that human error in configuring a new server into a live server farm can cause the server farm to malfunction, possibly resulting in loss of service to users of that Web site, is virtually eliminated.

The control plane also replicates data stored in SAN attached storage devices, so that failure of any particular storage element does not cause a loss of service to any part of the system. By decoupling long-lived storage from computing devices using SANs, and by providing redundant storage and computing elements, where any computing element can be attached to any storage partition, a high degree of availability is achieved.

A DETAILED EXAMPLE OF ESTABLISHING A VIRTUAL SERVER FARM, ADDING A PROCESSOR TO IT, AND REMOVING A PROCESSOR FROM IT

Figure 5:
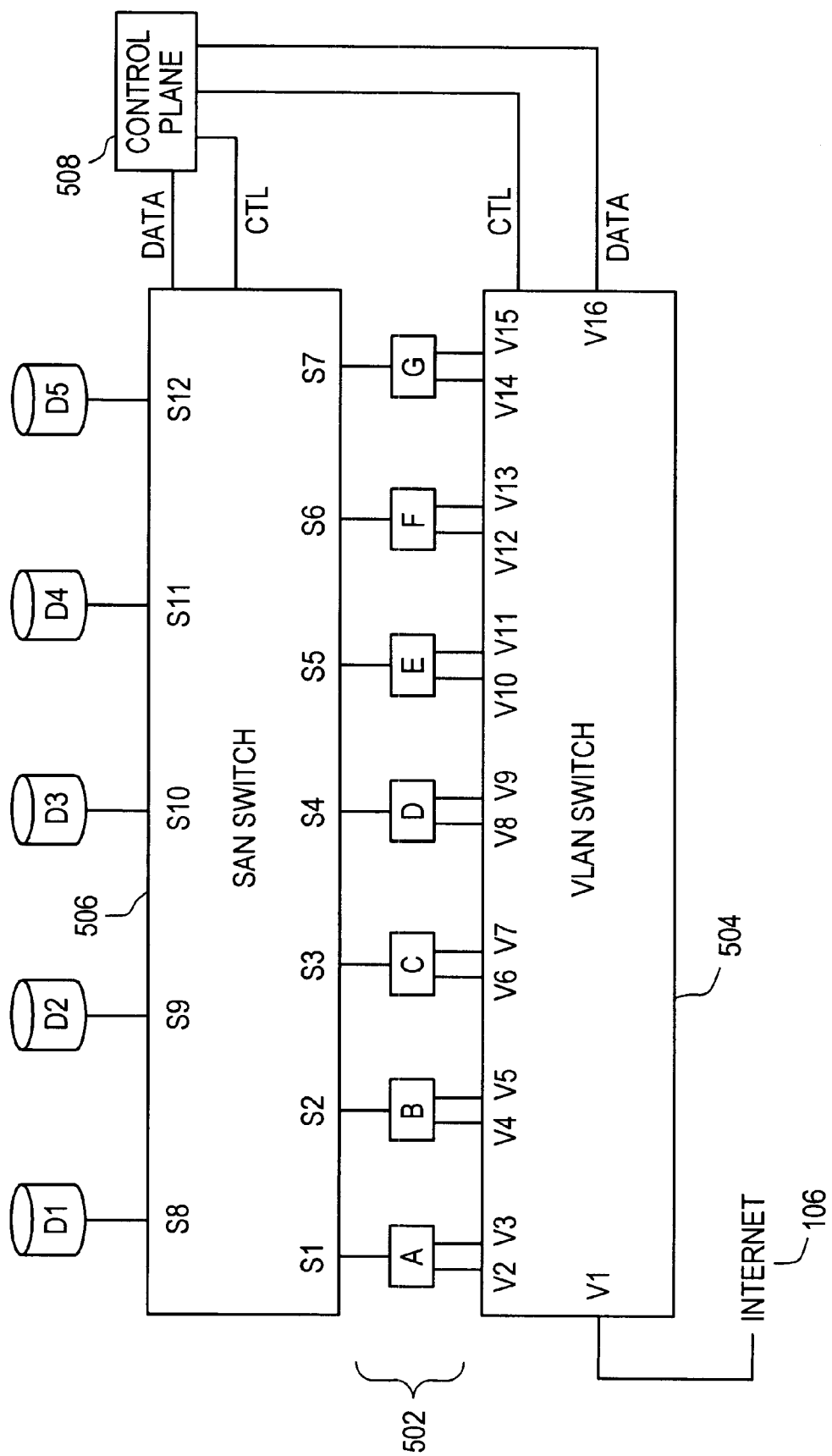
FIG. 5 is a block diagram of an embodiment of a virtual server farm system, computing grid, and supervisory mechanism.

FIG. 5 is a block diagram of a computing grid and control plane mechanism according to an embodiment. With reference to FIG. 5, the following describes the detailed steps that may be used to create a VSF, add nodes to it and delete nodes from it.

FIG. 5 depicts computing elements 502, comprising computers A through G coupled to VLAN capable switch 504. VLAN switch 504 is coupled to Internet 106, and the VLAN switch has ports V1, V2, etc. Computers A through G are further coupled to SAN switch 506, which is coupled to a plurality of storage devices or disks D1–D5. The SAN switch 506 has ports S1, S2, etc. A control plane mechanism 508 is communicatively coupled by control paths and data paths to SAN switch 506 and to VLAN switch 504. The control plane is able to send control commands to these devices through the control ports.

For the sake of simplicity and exposition, the number of computing elements in FIG. 5 is a small number. In practice, a large number of computers, e.g., thousands or more, and an equally large number of storage devices form the computing grid. In such larger structures, multiple SAN switches are interconnected to form a mesh, and multiple VLAN switches are interconnected to form a VLAN mesh. For clarity and simplicity, however, FIG. 5 shows a single SAN switch and a single VLAN switch.

Initially, all computers A-G are assigned to the idle pool until the control plane receives a request to create a VSF. All ports of the VLAN switch are assigned to a specific VLAN which we shall label as VLAN I (for the idle zone). Assume that the control plane is asked to construct a VSF, containing one load balancer/firewall and two Web servers connected to a storage device on the SAN. Requests to control plane may arrive through a management interface or other computing element.

In response, the control plane assigns or allocates CPU A as the load balancer/firewall, and allocates CPUs B and C as the Web servers. CPU A is logically placed in SAN Zone 1, and pointed to a bootable partition on a disk that contains dedicated load balancing/firewalling software. The term "pointed to" is used for convenience and is intended to indicate that CPU A is given, by any means, information sufficient to enable CPU A to obtain or locate appropriate software that it needs to operate. Placement of CPU A in SAN Zone 1 enables CPU A to obtain resources from disks that are controlled by the SAN of that SAN Zone.

The load balancer is configured by the control plane to know about CPUs B and C as the two Web servers it is supposed to load balance. The firewall configuration protects CPUs B and C against unauthorized access from the Internet 106. CPUs B and C are pointed to a disk partition on the SAN that contains a bootable OS image for a particular operating system (e.g., Solaris, Linux, NT etc) and Web server application software (e.g., Apache). The VLAN switch is configured to place ports v1 and v2 on VLAN 1, and ports v3, v4, v5, v6 and v7 on VLAN 2. The control plane configures the SAN switch 506 to place Fibre-Channel switch ports s1, s2, s3 and s8 into SAN zone 1.

A description of how a CPU is pointed to a particular disk drive, and what this means for booting up and shared access to disk data, is provided further herein.

Figure 6:
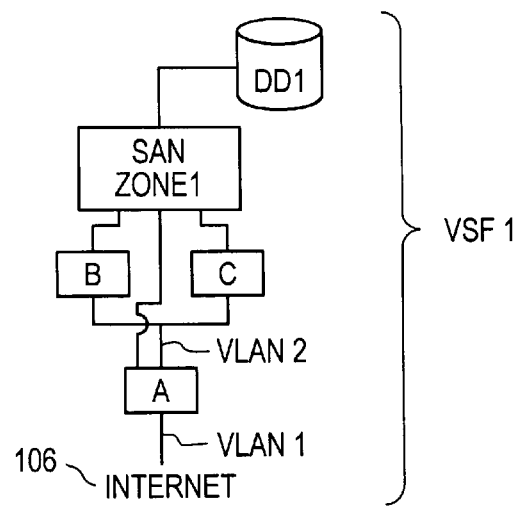
FIG. 6 is a block diagram of logical connections of a virtual server farm.

FIG. 6 is a block diagram of the resulting the logical connectivity of computing elements, which are collectively called VSF 1. Disk drive DD1 is selected from among storage devices D1, D2, etc. Once the logical structure as shown in FIG. 6 is achieved, CPUs A, B, C are given a power-up command. In response, CPU A becomes a dedicated load balancer/firewall-computing element, and CPUs B, C become Web servers.

Now, assume that because of a policy-based rule, the control plane determines that another Web server is required in VSF 1. This may be caused, for example, by an increased number of requests to the Web site and the customer's plan permits at least three Web servers to be added to VSF 1. Or it may be because the organization that owns or operates the VSF wants another server, and has added it through an administrative mechanism, such as a privileged Web page that allows it to add more servers to its VSF.

In response, the control plane decides to add CPU D to VSF 1. In order to do this, the control plane will add CPU D to VLAN 2 by adding ports v8 and v9 to VLAN 2. Also, CPU D's SAN port s4 is added to SAN zone 1. CPU D is pointed to a bootable portion of the SAN storage that boots up and runs as a Web server. CPU D also gets read-only access to the shared data on the SAN, which may consist of Web page contents, executable server scripts, etc. This way it is able to serve Web requests intended for the server farm much as CPUs B and C serve requests. The control plane will also configure the load balancer (CPU A) to include CPU D as part of the server set which is being load balanced.

Figure 7:
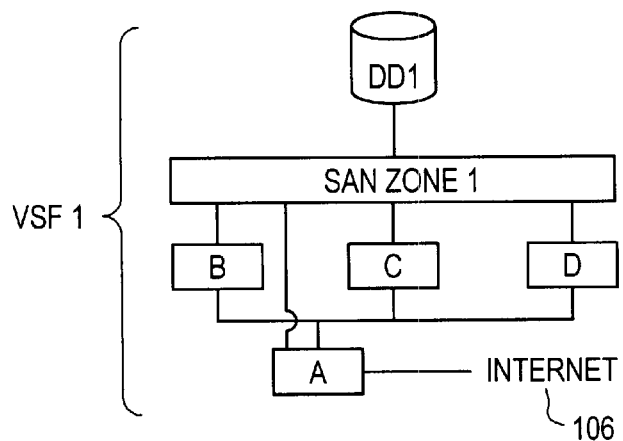
FIG. 7 is a block diagram of logical connections of a virtual server farm.

CPU D is now booted up, and the size of the VSF has now increased to three Web servers and 1 load balancer. FIG. 7 is a block diagram of the resulting logical connectivity.

Assume that the control plane now receives a request to create another VSF, which it will name VSF 2, and which needs two Web servers and one load balancer/firewall. The control plane allocates CPU E to be the load balancer/firewall and CPUs F, G to be the Web servers. It configures CPU E to know about CPUs F, G as the two computing elements to load balance against.

To implement this configuration, the control plane will configure VLAN switch 504 to include port v10, v11 in VLAN 1 (that is, connected to the Internet 106) and ports v12, v13 and v14, v15 to be in VLAN 3. Similarly, it configures SAN switch 506 to include SAN ports s6 and s7 and s9 in SAN zone 2. This SAN zone includes the storage containing the software necessary to run CPU E as a load-balancer and CPUs F and G as Web servers that use a shared read-only disk partition contained in Disk D2 in SAN zone 2.

Figure 8:
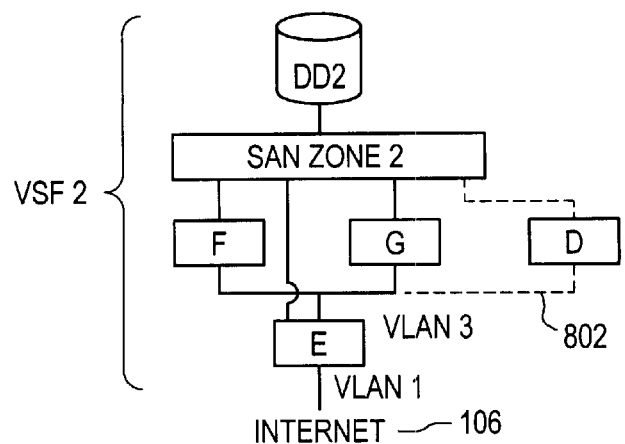
FIG. 8 is a block diagram of logical connections of a virtual server farm.

FIG. 8 is a block diagram of the resulting logical connectivity. Although two VSFs (VSF 1, VSF 2) share the same physical VLAN switch and SAN switch, the two VSFs are logically partitioned. Users who access CPUs B, C, D, or the enterprise that owns or operates VSF 1 can only access the CPUs and storage of VSF 1. Such users cannot access the CPUs or storage of VSF 2. This occurs because of the combination of the separate VLANs and the 2 firewalls on the only shared segment (VLAN 1), and the different SAN zones in which the two VSFs are configured.

Further assume that later, the control plane decides that VSF 1 can now fall back down to two Web servers. This may be because the temporary increase in load on VSF 1 has decreased, or it may be because of some other administrative action taken. In response, the control plane will shut down CPU D by a special command that may include powering down the CPU. Once the CPU has shut down, the control plane removes ports v8 and v9 from VLAN 2, and also removes SAN port s4 from SAN zone 1. Port s4 is placed in an idle SAN zone. The idle SAN zone may be designated, for example, SAN Zone I (for Idle) or Zone 0.

Some time later, the control plane may decide to add another node to VSF 2. This may be because the load on the Web servers in VSF 2 has temporarily increased or it may be due to other reasons. Accordingly, the control plane decides to place CPU D in VSF 2, as indicated by dashed path 802. In order to do this, it configures the VLAN switch to include ports v8, v9 in VLAN 3 and SAN port s4 in SAN zone 2. CPU D is pointed to the portion of the storage on disk device 2 that contains a bootable image of the OS and Web server software required for servers in VSF 2. Also, CPU D is granted read-only access to data in a file system shared by the other Web servers in VSF 2. CPU D is powered back up, and it now runs as a load-balanced Web server in VSF 2, and can no longer access any data in SAN zone 1 or the CPUs attached to VLAN 2. In particular, CPU D has no way of accessing any element of VSF 1, even though at an earlier point in time it was part of VSF 1.

Further, in this configuration, the security perimeter enforced by CPU E has dynamically expanded to include CPU D. Thus, embodiments provide dynamic firewalling that automatically adjusts to properly protect computing elements that are added to or removed from a VSF.

For purposes of explanation, embodiments have been described herein in the context of port-based SAN zoning. Other types of SAN zoning may also be used. For example, LUN level SAN zoning may be used to create SAN zones based upon logical volumes within disk arrays. An example product that is suitable for LUN level SAN zoning is the Volume Logics Product from EMC Corporation.

DISK DEVICES ON THE SAN

There are several ways by which a CPU can be pointed to a particular device on the SAN, for booting up purposes, or for accessing disk storage which needs to be shared with other nodes, or otherwise provided with information about where to find bootup programs and data.

One way is to provide a SCSI-to-Fibre Channel bridging device attached to a computing element and a SCSI interface for the local disks. By routing that SCSI port to the right drive on the Fibre-Channel SAN, the computer can access the storage device on the Fibre-Channel SAN just as it would access a locally attached SCSI disk. Therefore, software such as boot-up software simply boots off the disk device on the SAN just as it would boot off a locally attached SCSI disk.

Another way is to have a Fibre-Channel interface on the node and associated device-driver and boot ROM and OS software that permits the Fibre-Channel interface to be used as a boot device.

Yet another way is to have an interface card (e.g., PCI bus or Sbus) which appears to be a SCSI or IDE device controller but that in turn communicates over the SAN to access the disk. Operating systems such as Solarns in tegrally provide diskless boot functions that can be used in this a alternative.

Typically there will be two kinds of SAN disk devices associated with a give n node. The first is one which is not logically shared with other computing elements, and constitutes what is normally a per-node root partition containing bootable OS images, local configuration files, etc. This is the equivalent of the root file system on a Unix system.

The second kind of disk is shared storage with other nodes. The kind of sharing varies by the OS software running on the CPU and the needs of the nodes accessing the shared storage. If the OS provides a cluster file system that allows read/write access of a shared-disk partition between multiple nodes, the shared disk is mounted as such a cluster file system. Similarly, the system may use database software such as Oracle Parallel Server that permits multiple nodes running in a cluster to have concurrent read/write access to a shared disk. In such cases, a shared disk is already designed into the base OS and application software.

For operating systems where such shared access is not possible, because the OS and associated applications cannot manage a disk device shared with other nodes, the shared disk can be mounted as a read-only device. For many Web applications, having read-only access to Web related files is sufficient. For example, in Unix systems, a particular file system may be mounted as read-only.

MULTI-SWITCH COMPUTING GRID

The configuration described above in connection with FIG. 5 can be expanded to a large number of computing and storage nodes by interconnecting a plurality of VLAN switches to form a large switched VLAN fabric, and by interconnecting multiple SAN switches to form a large switched SAN mesh. In this case, a computing grid has the architecture generally shown in FIG. 5, except that the SAN/VLAN switched mesh contains a very large number of ports for CPUs and storage devices. A number of computing elements running the control plane can be physically connected to the control ports of the VLAN/SAN switches, as described further below. Interconnection of multiple VLAN switches to create complex multi-campus data networks is known in this field. See, for example, G. Haviland, "Designing High-Performance Campus Intranets with Multilayer Switching," Cisco Systems, Inc., and information available from Brocade.

SAN ARCHITECTURE

The description assumes that the SAN comprises Fibre-Channel switches and disk devices, and potentially Fibre-Channel edge devices such as SCSI-to-Fibre Channel bridges. However, SANs may be constructed using alternative technologies, such as Gigabit Ethernet switches, or switches that use other physical layer protocols. In particular, there are efforts currently underway to construct SANs over IP networks by running the SCSI protocol over IP. The methods and architecture described above is adaptable to these alternative methods of constructing a SAN. When a SAN is constructed by running a protocol like SCSI over IP over a VLAN capable layer 2 environment, then SAN zones are created by mapping them to different VLANs.

Also, Network Attached Storage (NAS) may be used, which works over LAN technologies such as fast Ethernet or Gigabit Ethernet. With this option, different VLANs are used in place of the SAN zones in order to enforce security and the logical partitioning of the computing grid. Such NAS devices typically support network file systems such as Sun's NSF protocol, or Microsoft's SMB, to allow multiple nodes to share the same storage.

CONTROL PLANE IMPLEMENTATION

As described herein, control planes may be implemented as one or more processing resources that are coupled to control and data ports of the SAN and VLAN switches. A variety of control plane implementations may be used and the invention is not limited to any particular control plane implementation. Various aspects of control plane implementation are described in more detail in the following sections: 1) control plane architecture; 2) master segment manager election; 3) administrative functions; and 4) policy and security considerations.

1. Control Plane Architecture

According to one embodiment, a control plane is implemented as a control process hierarchy. The control process hierarchy generally includes one or more master segment manager mechanisms that are communicatively coupled to and control one or more slave segment manager mechanisms. The one or more slave segment manager mechanisms control one or more farm managers. The one or more farm managers manage one or more VSFs. The master and slave segment manager mechanisms may be implemented in hardware circuitry, computer software, or any combination thereof.

Figure 9:
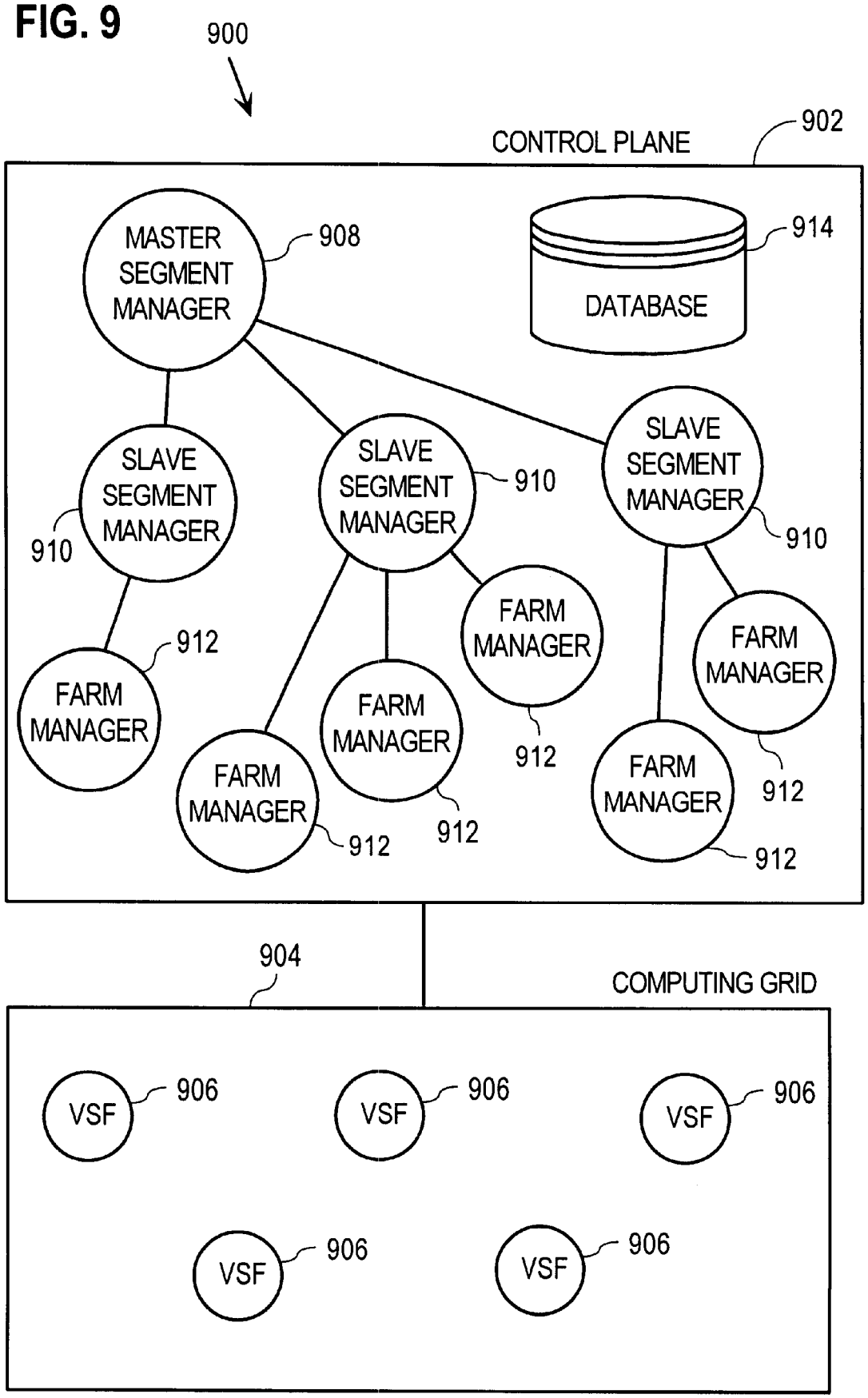
FIG. 9 is a block diagram of a logical relationship between a control plane and a data plane.

FIG. 9 is a block diagram 900 that illustrates a logical relationship between a control plane 902 and a computing grid 904 according to one embodiment. Control plane 902 controls and manages computing, networking and storage elements contained in computing grid 904 through special control ports or interfaces of the networking and storage elements in computing grid 904. Computing grid 904 includes a number of VSFs 906 or logical resource groups created in accordance with an embodiment as previously described herein.

According to one embodiment, control plane 902 includes a master segment manager 908, one or more slave segment managers 910 and one or more farm managers 912. Master segment manager 908, slave segment managers 910 and farm managers 912 may be colocated on a particular computing platform or may be distributed on multiple computing platforms. For purposes of explanation, only a single master segment manager 908 is illustrated and described, however, any number of master segment managers 908 may be employed.

Master segment manager 908 is communicatively coupled to, controls and manages slave segment managers 910. Each slave segment manager 910 is communicatively coupled to and manages one or more farm managers 912. According to one embodiment, each farm manager 912 is co-located on the same computing platform as the corresponding slave segment managers 910 with which it is communicatively coupled. Farm managers 912 establish, configure and maintain VSFs 906 on computing grid 904. According to one embodiment, each farm manager 912 is assigned a single VSF 906 to manage, however, farm managers 912 may also be assigned multiple VSFs 906. Farm managers 912 do not communicate directly with each other, but only through their respective slave segment managers 910. Slave segment managers 910 are responsible for monitoring the status of their assigned farm managers 912. Slave segment managers 910 restart any of their assigned farm managers 912 that have stalled or failed.

Master segment manager 908 monitors the loading of VSFs 906 and determines an amount of resources to be allocated to each VSF 906. Master segment manager 908 then instructs slave segment managers 910 to allocate and de-allocate resources for VSFs 906 as appropriate through farm managers 912. A variety of load balancing algorithms may be implemented depending upon the requirements of a particular application and the invention is not limited to any particular load balancing approach.

Master segment manager 908 monitors loading information for the computing platforms on which slave segment managers 910 and farm managers 912 are executing to determine whether computing grid 904 is being adequately serviced. Master segment manager 908 allocates and de-allocates slave segment managers 910 and instructs slave segment managers 910 to allocate and de-allocate farm managers 912 as necessary to provide adequate management of computing grid 904. According to one embodiment, master segment manager 908 also manages the assignment of VSFs to farm managers 912 and the assignment of farm managers 912 to slave segment managers 910 as necessary to balance the load among farm managers 912 and slave segment managers 910. According to one embodiment, slave segment managers 910 actively communicate with master segment manager 908 and request changes to computing grid 904 and to request additional slave segment managers 910 and/or farm managers 912. If a processing platform fails on which one or more slave segment managers 910 and one or more farm managers 912 are executing, then master segment manager 908 reassigns the VSFs 906 from the farm managers 912 on the failed computing platform to other farm managers 912. In this situation, master segment manager 908 may also instruct slave segment managers 910 to initiate additional farm managers 912 to handle the reassignment of VSFs 906. Actively managing the number of computational resources allocated to VSFs 906, the number of active farm managers 912 and slave segment managers 910 allows overall power consumption to be controlled. For example, to conserve power master segment manager 908 may shutdown computing platforms that have no active slave segment mangers 910 or farm managers 912. The power savings can be significant with large computing grids 904 and control planes 902.

According to one embodiment, master segment manager 908 manages slave segment managers 910 using a registry. The registry contains information about current slave segment managers 910 such as their state and assigned farm managers 912 and assigned VSFs 906. As slave segment managers 910 are allocated and de-allocated, the registry is updated to reflect the change in slave segment managers 910. For example, when a new slave segment manager 910 is instantiated by master segment manager 908 and assigned one or more VSFs 906, the registry is updated to reflect the creation of the new slave segment manager 910 and its assigned farm managers 912 and VSFs 906. Master segment manager 908 may then periodically examine the registry to determine how to best assign VSFs 906 to slave segment managers 910.

According to one embodiment, the registry contains information about master segment manager 908 that can be accessed by slave segment managers 910. For example, the registry may contain data that identifies one or more active master segment managers 908 so that when a new slave segment manager 910 is created, the new slave segment manager 910 may check the registry to learn the identity of the one or more master segment managers 908.

The registry may be implemented in many forms and the invention is not limited to any particular implementation. For example, the registry may be a data file stored on a database 914 within control plane 902. The registry may instead be stored outside of control plane 902. For example, the registry may be stored on a storage device in computing grid 904. In this example, the storage device would be dedicated to control plane 902 and not allocated to VSFs 906.

2. Master Segment Manager Election

In general, a master segment manager is elected when a control plane is established or after a failure of an existing master segment manager. Although there is generally a single master segment manager for a particular control plane, there may be situations where it is advantageous to elect two or more master segment managers to co-manage the slave segment managers in the control plane.

According to one embodiment, slave segment managers in a control plane elect a master segment manager for that control plane. In the simple case where there is no master segment manager and only a single slave segment manager, then the slave segment manager becomes the master segment manager and allocates additional slave segment managers as needed. If there are two or more slave segment managers, then the two or more slave processes elect a new master segment manager by vote, e.g., by a quorum.

Since slave segment managers in a control plane are not necessarily persistent, particular slave segment managers may be selected to participate in a vote. For example, according to one embodiment, the register includes a timestamp for each slave segment manager that is periodically updated by each slave segment manager. The slave segment managers with timestamps that have been most recently updated, as determined according to specified selection criteria, are most likely to still be executing and are selected to vote for a new master segment manager. For example, a specified number of the most recent slave segment managers may be selected for a vote.

According to another embodiment, an election sequence number is assigned to all active slave segment managers and a new master segment manager is determined based upon the election sequence numbers for the active slave segment managers. For example, the lowest or highest election sequence number may be used to select a particular slave segment manager to be the next (or first) master segment manager.

Once a master segment manager has been established, the slave segment managers in the same control plane as the master segment manager periodically perform a health check on the master segment manager by contacting (ping) the current master segment manager to determine whether the master segment manager is still active. If a determination is made that the current master segment manager is no longer active, then a new master segment manager is elected.

Figure 10:
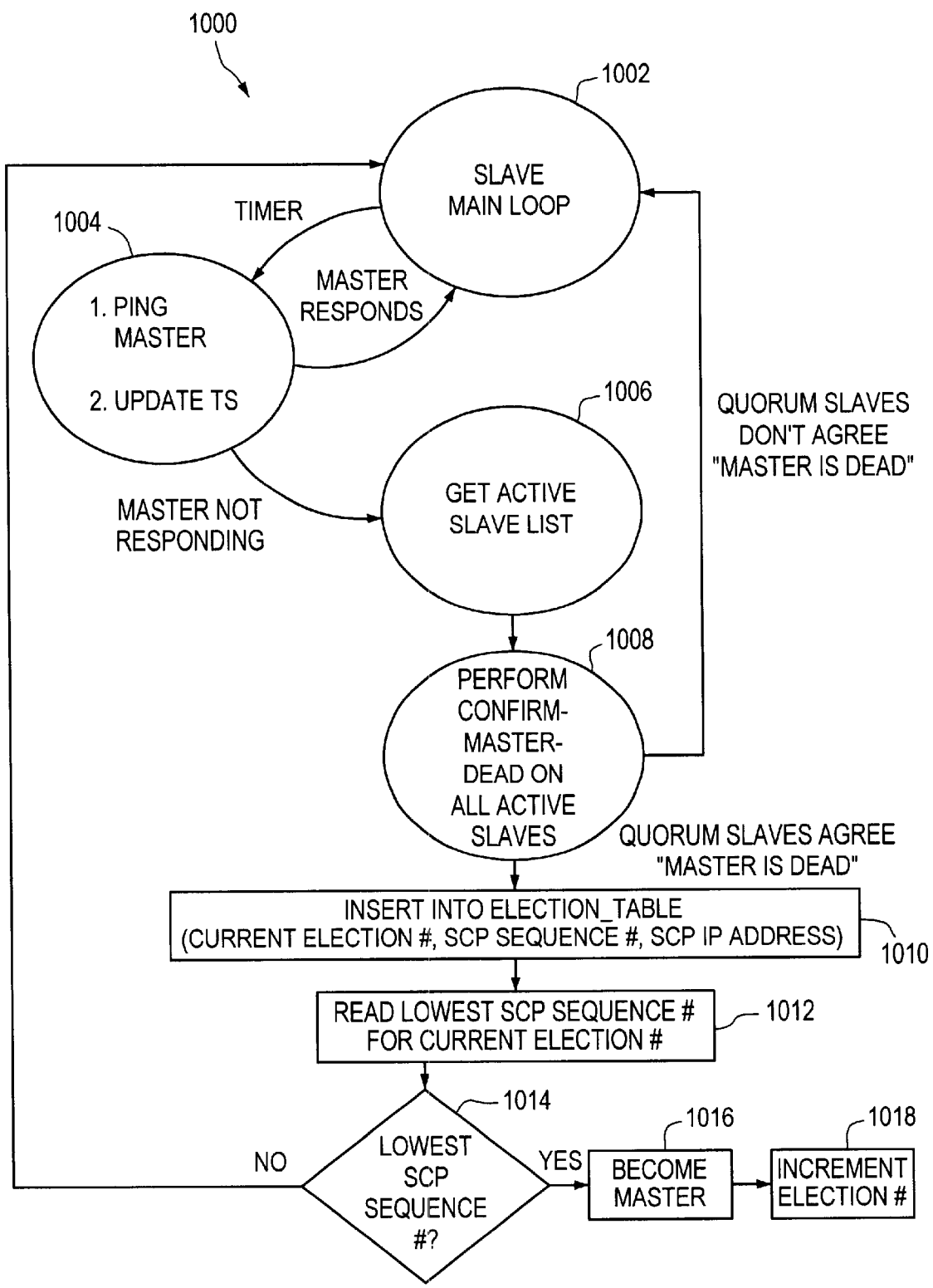
FIG. 10 is a state diagram of a master control election process.

FIG. 10 depicts a state diagram 1000 of a master segment manager election according to an embodiment. In state 1002, which is the slave segment manager main loop, the slave segment manager waits for the expiration of a ping timer. Upon expiration of the ping timer, state 1004 is entered. In state 1004, the slave segment manager pings the master segment manager. Also in state 1004, timestamp (TS) for the slave segment manager is updated. If the master segment manager responds to the ping, then the master segment manager is still active and control returns to state 1002. If no response is received from the master segment manager after a specified period of time, then state 1006 is entered.

In state 1006, an active slave segment manager list is obtained and control proceeds to state 1008. In state 1008, a check is made to determine whether other slave segment managers have also not received a response from the master segment manager. Instead of sending messages to slave segment managers to make this determination, this information may be obtained from a database. If the slave segment managers do not agree that master segment manager is no longer active, i.e., one or more of the slave segment managers received a timely response from the master segment manager, then it is presumed that the current master segment manager is still active and control returns to state 1002. If a specified number of the slave segment managers have not received a timely response from the current master segment manager, then it is assumed that the current master segment manager is "dead", i.e., no longer active, and control proceeds to state 1010.

In state 1010, the slave segment manager that initiated the process retrieves a current election number from an election table and the next election number from a database. The slave segment manager then updates the election table to include an entry that specifies the next election number and a unique address into a master election table. Control then proceeds to state 1012 where the slave segment manager reads the lowest sequence number for the current election number. In state 1014, a determination is made whether the particular slave segment manager has the lowest sequence number. If not, then control returns to state 1002. If so, then control proceeds to state 1016 where the particular slave segment manager becomes the master segment manager. Control then proceeds to state 1018 where the election number is incremented.

As described above, slave segment managers are generally responsible for servicing their assigned VSFs and allocating new VSFs in response to instructions from the master segment manager. Slave segment managers are also responsible for checking on the master segment manager and electing a new master segment manager if necessary.

Figure 11:
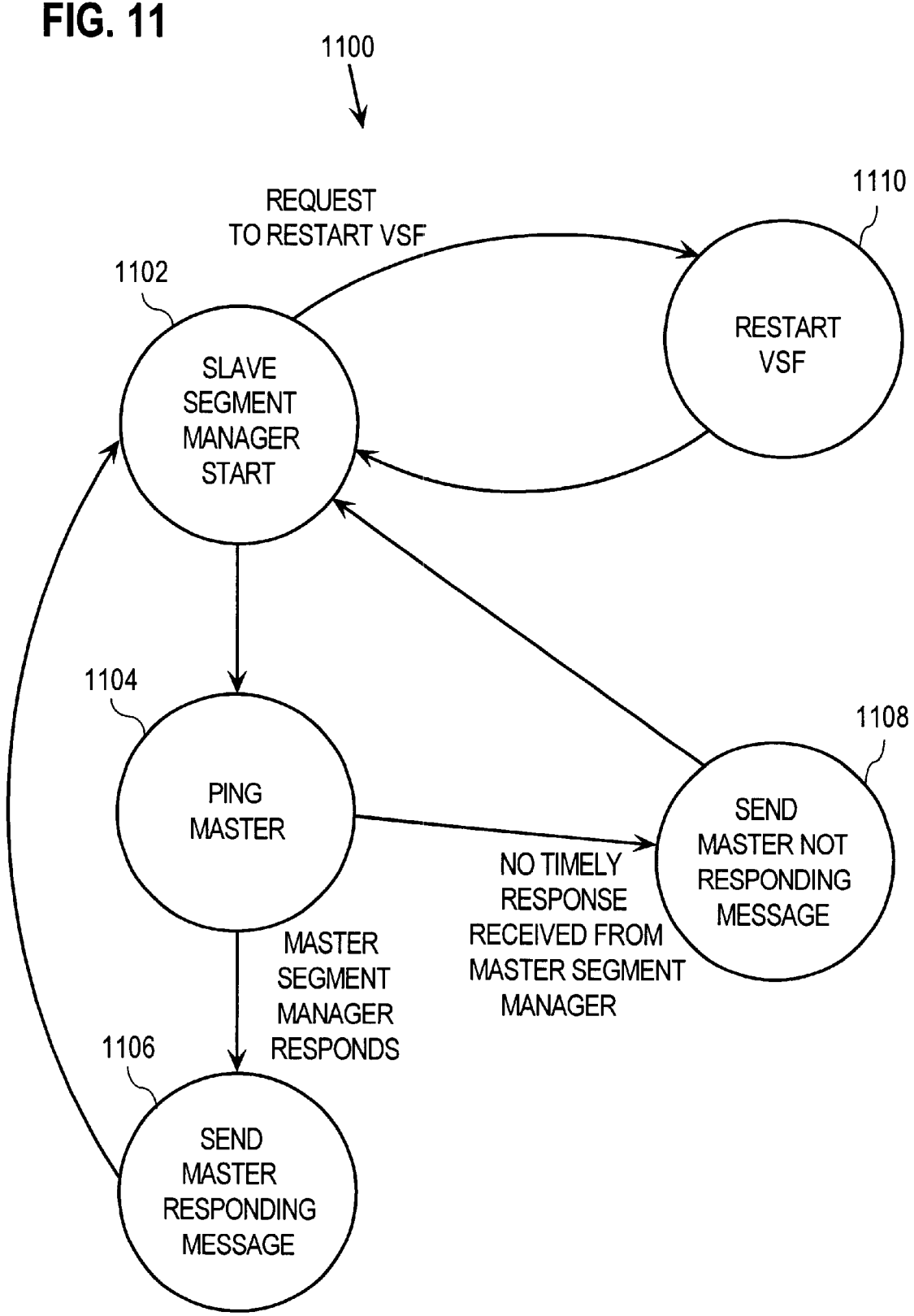
FIG. 11 is a state diagram for a slave control process.

FIG. 11 is a state diagram 1100 that illustrates various states of a slave segment manager according to an embodiment. Processing starts in a slave segment manager start state 1102. From state 1102, control proceeds to state 1104 in response to a request to confirm the state of the current master segment manager. In state 1104, the slave segment manager sends a ping to the current master segment manager to determine whether the current master segment manager is still active. If a timely response is received from the current master segment manager, the control proceeds to state 1106. In state 1106, a message is broadcast to other slave segment managers to indicate that the master segment manager responded to the ping. From state 1106, control returns to start state 1102.

In state 1104 if no timely master response is received, then control proceeds to state 1108. In state 1108, a message is broadcast to other slave segment managers to indicate that the master segment manager did not respond to the ping. Control then returns to start state 1102. Note that if a sufficient number of slave segment managers do not receive a response from the current master segment manager, then a new master segment manager is elected as described herein.

From start state 1102, control proceeds to state 1110 upon receipt of a request from the master segment manager to restart a VSF. In state 1110, a VSF is restarted and control returns to start state 1102.

As described above, a master segment manager is generally responsible for ensuring that VSFs in the computing grid controlled by the master segment manager are adequately serviced by one or more slave segment managers. To accomplish this, the master segment manager performs regular health checks on all slave segment managers in the same control plane as the master segment manager. According to one embodiment, master segment manager 908 periodically requests status information from slave segment managers 910. The information may include, for example, which VSFs 906 are being serviced by slave segment managers 910. If a particular slave segment manager 910 does not respond in a specified period of time, master segment manager 908 attempts to restart the particular slave segment manager 910. If the particular slave segment manager 910 cannot be restarted, then master segment manager 908 re-assigns the farm managers 912 from the failed slave segment manager 910 to another slave segment manager 910. Master segment manager 908 may then instantiate one or more additional slave segment managers 910 to re-balance the process loading. According to one embodiment, master segment manager 908 monitors the health of the computing platforms on which slave segment managers 910 are executing. If a computing platform fails, then master segment manager 908 reassigns the VSFs assigned to farm managers 912 on the failed computing platform to farm managers 912 on another computing platform.

Figure 12:
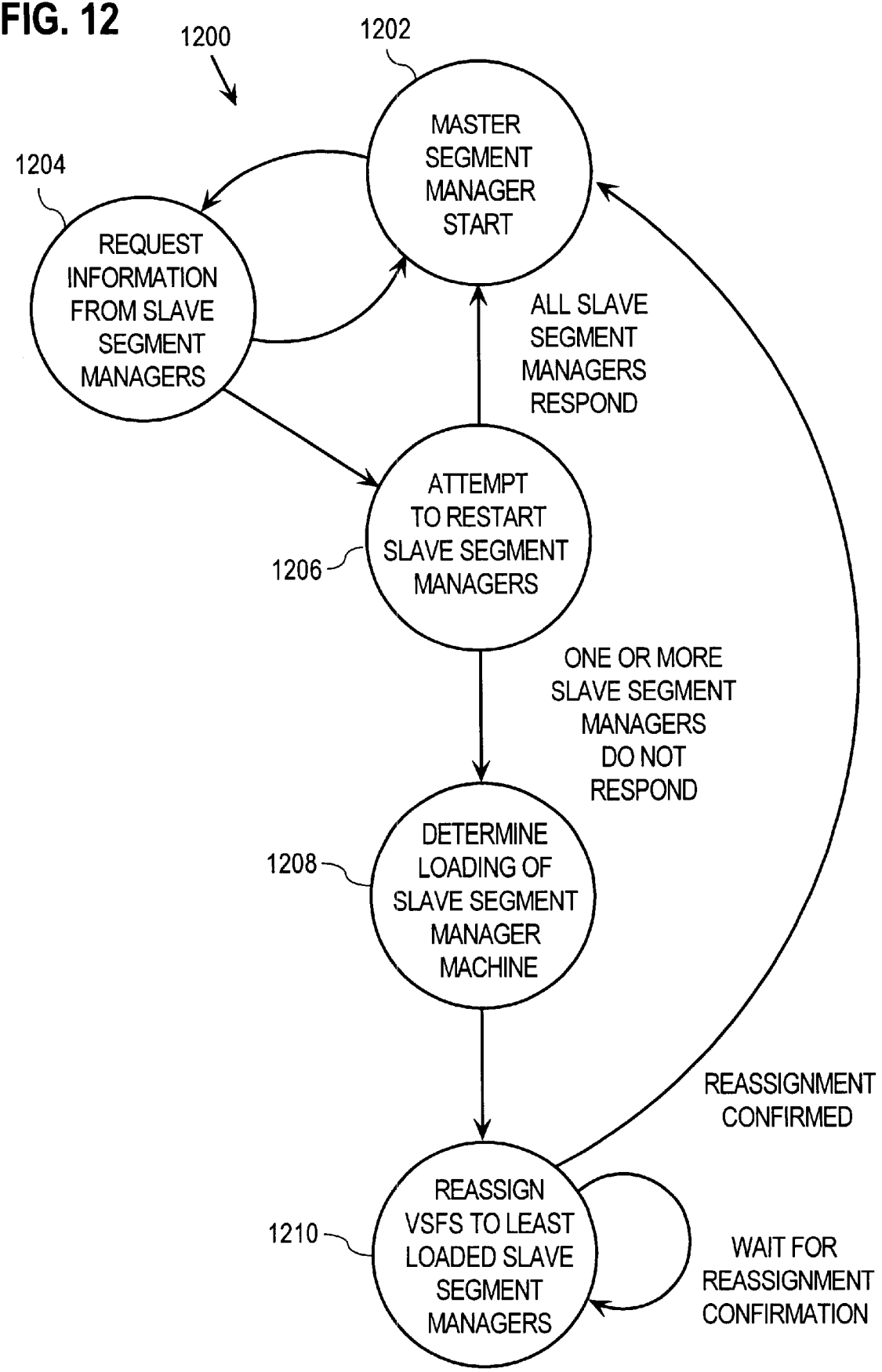
FIG. 12 is a state diagram for a master control process.

FIG. 12 is a state diagram 1200 for a master segment manager. Processing starts in a master segment manager start state 1202. From state 1202, control proceeds to state 1204 when master segment manager 908 makes a periodic health check or request to slave segment managers 910 in control plane 902. From state 1204, if all slave segment managers 910 respond as expected, then control returns to state 1202. This occurs if all slave segment managers 910 provide the specified information to master segment manager 908, indicating that all slave segment managers 910 are operating normally. If one or more slave segment managers 910 either don't respond, or the response otherwise indicates that one or more slave segment managers 910 have failed, then control proceeds to state 1206.

In state 1206, master segment manager 908 attempts to restart the failed slave segment managers 910. This may be accomplished in several ways. For example, master segment manager 908 may send a restart message to a non-responsive or failed slave segment manager 910. From state 1206, if all slave segment managers 910 respond as expected, i.e., have been successfully restarted, then control returns to state 1202. For example, when a failed slave segment manager 910 is successfully restarted, the slave segment manager 910 sends a restart confirmation message to master segment manager 908. From state 1206, if one or more slave segment managers have not been successfully restarted, then control proceeds to state 1208. This situation may occur if master segment manager 908 does not receive a restart confirmation message from a particular slave segment manager 910.

In state 1208, master segment manager 908 determines the current loading of the machines on which slave segment managers 910 are executing. To obtain the slave segment manager 908 loading information, master segment manager 908 polls slave segment managers 910 directly or obtains the loading information from another location, for example from database 914. The invention is not limited to any particular approach for master segment manager 908 to obtain the loading information for slave segment managers 910.

Control then proceeds to state 1210 where the VSFs 906 assigned to the failed slave segment managers 910 are re-assigned to other slave segment managers 910. The slave segment managers 910 to which the VSFs 906 are assigned inform master segment manager 908 when the reassignment has been completed. For example, slave segment managers 910 may send a reassignment confirmation message to master segment manager 908 to indicate that the reassignment of VSFs 906 has been successfully completed. Control remains in state 1210 until reassignment of all VSFs 906 associated with the failed slave segment managers 910 has been confirmed. Once confirmed, control returns to state 1202.

Instead of reassigning VSFs 906 associated with a failed slave segment manager 910 to other active slave segment managers 910, master segment manager 908 may allocate additional slave segment managers 910 and then assign those VSFs 906 to the new slave segment managers 910. The choice of whether to reassign VSFs 906 to existing slave segment managers 910 or to new slave segment managers 910 depends, at least in part, on latencies associated with allocating new slave segment managers 910 and latencies associated with reassigning VSFs 906 to an existing slave segment manager 910. Either approach may be used depending upon the requirements of a particular application and the invention is not limited to either approach.

3. Administrative Functions

Figure 13:
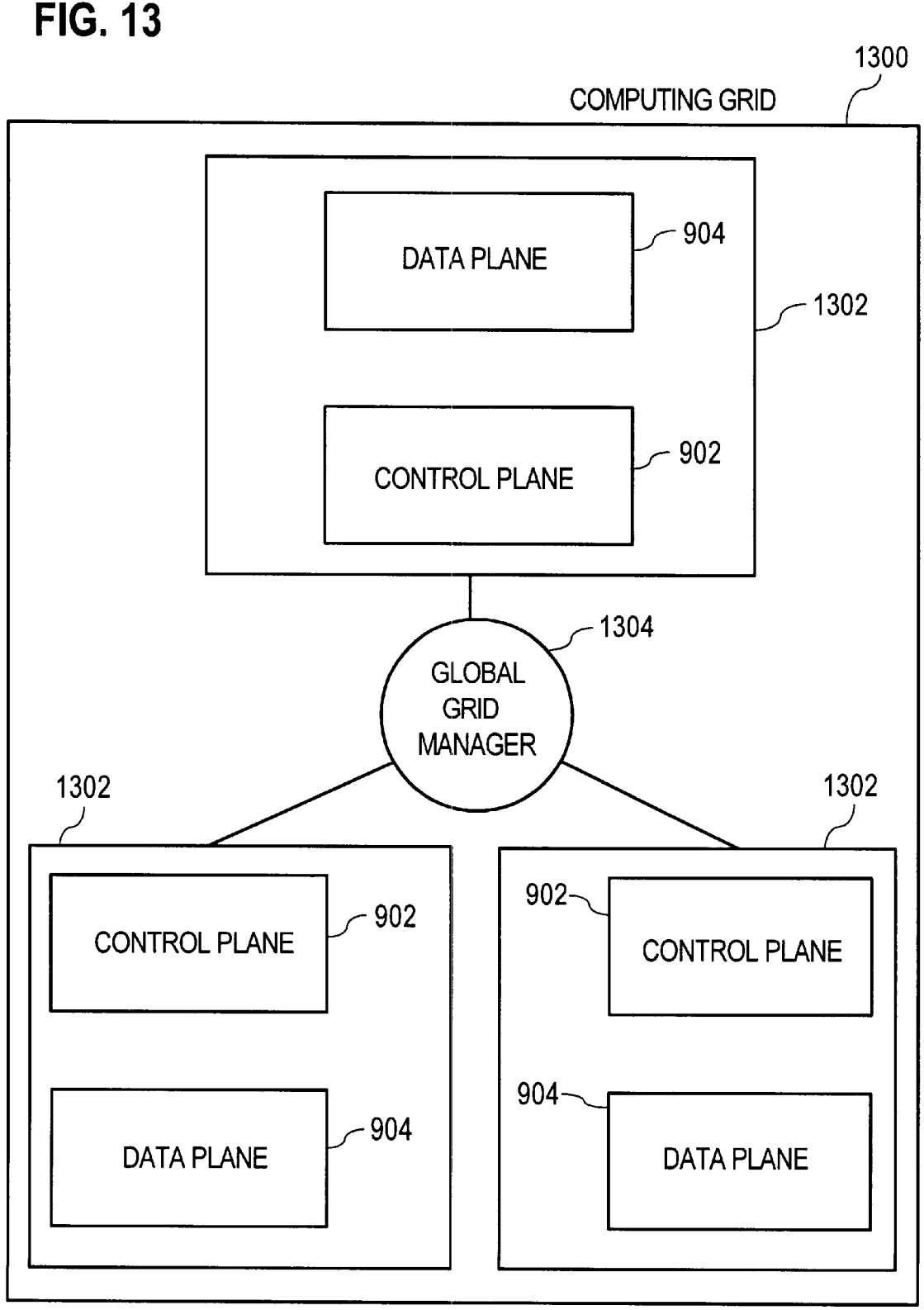
FIG. 13 is a block diagram of a central control processor and multiple control planes and computing grids.

According to one embodiment, control plane 902 is communicatively coupled to a global grid manager. Control plane 902 provides billing, fault, capacity, loading and other computing grid information to the global grid manager. FIG. 13 is a block diagram 1300 that illustrates the use of a global grid manager according to an embodiment.

In FIG. 13, a computing grid 1300 is partitioned into logical portions called grid segments 1302. Each grid segment 1302 includes a control plane 902 that controls and manages a data plane 904. In this example, each data plane 904 is the same as the computing grid 904 of FIG. 9, but are referred to as "data planes" to illustrate the use of a global grid manager to manage multiple control planes 902 and data planes 904, i.e., grid segments 1302.

Each grid segment is communicatively coupled to a global grid manager 1304. Global grid manager 1304, control planes 902 and computing grids 904 may be co-located on a single computing platform or may be distributed across multiple computing platforms and the invention is not limited to any particular implementation.

Global grid manager 1304 provides centralized management and services for any number of grid segments 1302. Global grid manager 1304 may collect billing, loading and other information from control planes 902 used in a variety of administrative tasks. For example, the billing information is used to bill for services provided by computing grids 904.

4. Policy and Security Considerations

As described herein, a slave segment manager in a control plane must be able to communicate with its assigned VSFs in a computing grid. Similarly, VSFs in a computing grid must be able to communicate with their assigned slave segment manager. Further, VSFs in a computing grid must not be allowed to communicate with each other to prevent one VSF from in any way causing a change in the configuration of another VSF. Various approaches for implementing these policies are described hereinafter.

Figure 14:
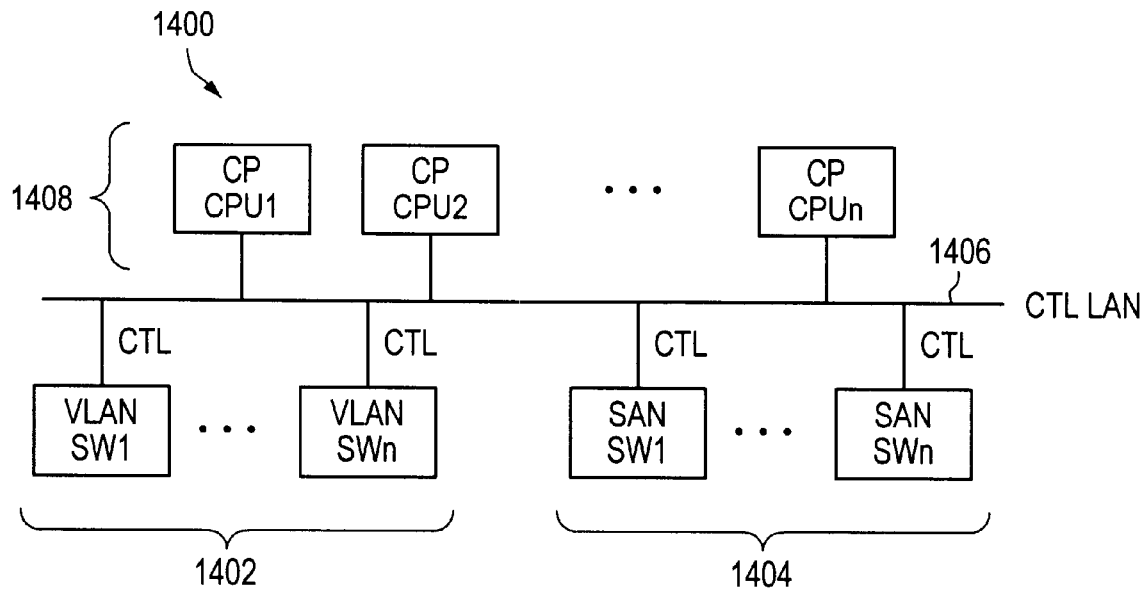
FIG. 14 is a block diagram of an architecture for implementing portions of a control plane and a computing grid.

FIG. 14 is a block diagram 1400 of an architecture for connecting a control plane to a computing grid according to an embodiment. Control ("CTL") ports of VLAN switches (VLAN SW1 through VLAN SWn), collectively identified by reference numeral 1402, and SAN switches (SAN SW1 through SAN SWn), collectively identified by reference numeral 1404, are connected to an Ethernet subnet 1406. Ethernet subnet 1406 is connected to a plurality of computing elements (CPU1, CPU2 through CPUn), that are collectively identified by reference numeral 1408. Thus, only computing elements of control plane 1408 are communicatively coupled to the control ports (CTL) of VLAN switches 1402 and SAN switches 1404. This configuration prevents computing elements in a VSF (not illustrated), from changing the membership of the VLANs and SAN zones associated with itself or any other VSF. This approach is also applicable to situations where the control ports are serial or parallel ports. In these situations, the ports are coupled to the control plane 1408 computing elements.

Figure 15:
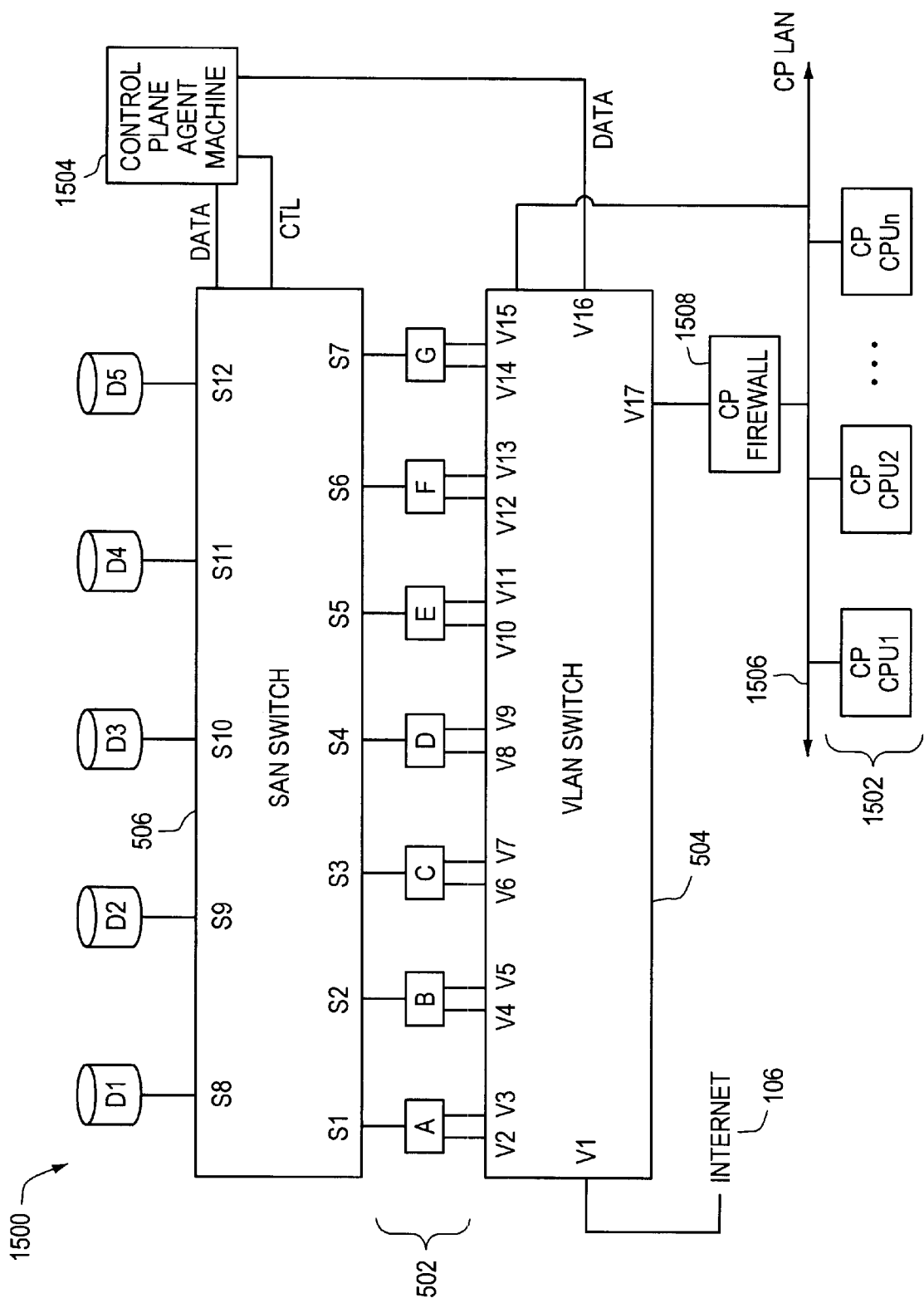
FIG. 15 is a block diagram of a system with a computing grid that is protected by a firewall.

FIG. 15 is a block diagram 1500 of a configuration for connecting control plane computing elements (CP CPU1, CP CPU2 through CP CPUn) 1502 to data ports according to an embodiment. In this configuration, control plane computing elements 502 periodically send a packet to a control plane agent 1504 that acts on behalf of control plane computing elements 1502. Control plane agent 1504 periodically polls computing elements 502 for real-time data and sends the data to control plane computing elements 1502. Each segment manager in control plane 1502 is communicatively coupled to a control plane (CP) LAN 1506. CP LAN 1506 is communicatively coupled to a special port V17 of VLAN Switch 504 through a CP firewall 1508. This configuration provides a scalable and secure means for control plane computing elements 1502 to collect real-time information from computing elements 502.

Figure 16:
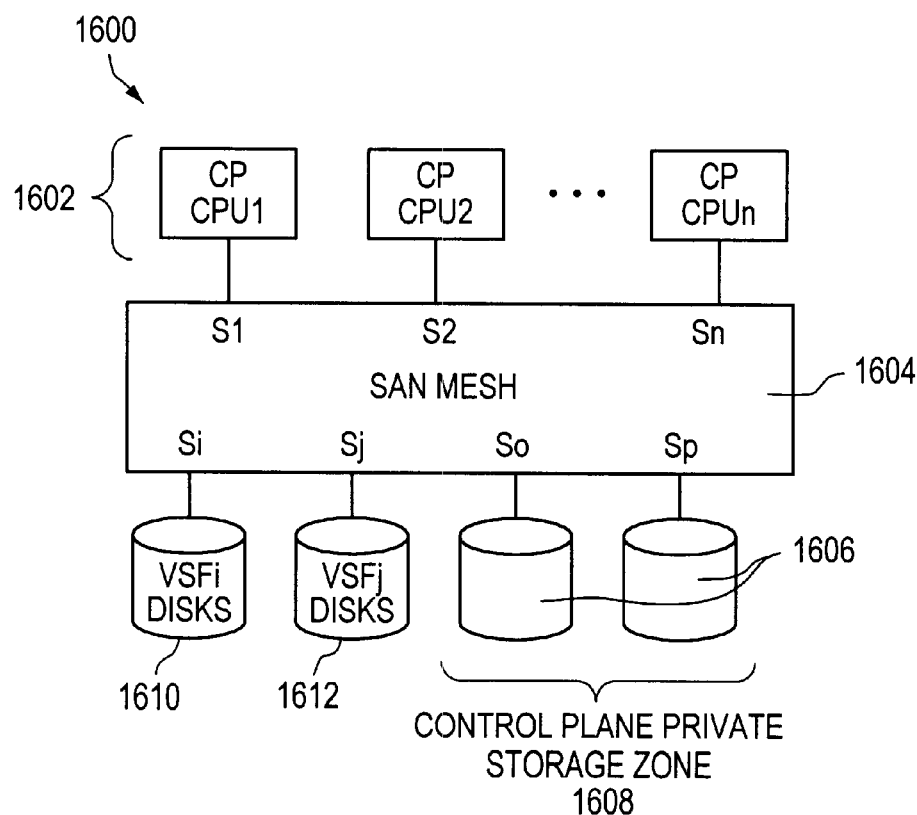
FIG. 16 is a block diagram of an architecture for connecting a control plane to a computing grid.

FIG. 16 is a block diagram 1600 of an architecture for connecting a control plane to a computing grid according to an embodiment. A control plane 1602 includes control plane computing elements CP CPU1, CP CPU2 through CP CPUn. Each control plane computing element CP CPU1, CP CPU2 through CP CPUn in control plane 1602 is communicatively coupled to a port S1, S2 through Sn of a plurality of SAN switches that collectively form a SAN mesh 1604.

SAN mesh 1604 includes SAN ports So, Sp that are communicatively coupled to storage devices 1606 that contain data that is private to control plane 1602. Storage devices 1606 are depicted in FIG. 16 as disks for purposes of explanation. Storage devices 1606 may be implemented by any type of storage medium and the invention is not limited to any particular type of storage medium for storage devices 1606. Storage devices 1606 are logically located in a control plane private storage zone 1608. Control plane private storage zone 1608 is an area where control plane 1602 maintains log files, statistical data, current control plane configuration information and software that implements control plane 1602. SAN ports So, Sp are only part of the control plane private storage zone and are never placed on any other SAN zone so that only computing elements in control plane 1602 can access the storage devices 1606. Furthermore, ports S1, S2 through Sn, So and Sp are in a control plane SAN zone that may only be communicatively coupled to computing elements in control plane 1602. These ports are not accessible by computing elements in VSFs (not illustrated).

According to one embodiment, when a particular computing element CP CPU1, CP CPU2 through CP CPUn needs to access a storage device, or a portion thereof, that is part of a particular VSF, the particular computing element is placed into the SAN zone for the particular VSF. For example, suppose that computing element CP CPU 2 needs to access VSFi disks 1610. In this situation, port s2, which is associated with control plane CP CPU 2, is placed in the SAN zone of VSFi, which includes port Si. Once computing element CP CPU2 is done accessing the VSFi disks 1610 on port Si, computing element CP CPU2 is removed from the SAN zone of VSFi.

Similarly, suppose computing element CP CPU 1 needs to access VSFj disks 1612. In this situation, computing element CP CPU 1 is placed in the SAN zone associated with VSFj. As a result, port S1 is placed in the SAN zone associated with VSFj, which includes the zone containing port Sj. Once computing element CP CPU1 is done accessing the VSFj disks 1612 connected to port Sj, computing element CP CPU1 is removed from the SAN zone associated with VSFj. This approach ensures the integrity of control plane computing elements and the control plane storage zone 1608 by tightly controlling access to resources using tight SAN zone control.

As previously described, a single control plane computing element may be responsible for managing several VSFs. Accordingly, a single control plane computing element must be capable of manifesting itself in multiple VSFs simultaneously, while enforcing firewalling between the VSFs according to policy rules established for each control plane. Policy rules may be stored in database 914 (FIG. 9) of each control plane or implemented by central segment manager 1302 (FIG. 13).

According to one embodiment, tight binding between VLAN tagging and IP addresses are used to prevent spoofing attacks by a VSF since (physical switch) port-based VLAN tags are not spoofable. An incoming IP packet on a given VLAN interface must have the same VLAN tag and IP address as the logical interface on which the packet arrives. This prevents IP spoofing attacks where a malicious server in a VSF spoofs the source IP address of a server in another VSF and potentially modifies the logical structure of another VSF or otherwise subverts the security of computing grid functions. Circumventing this VLAN tagging approach requires physical access to the computing grid which can be prevented using high security (Class A) data centers.

A variety of network frame tagging formats may be used to tag data packets and the invention is not limited to any particular tagging format. According to one embodiment, IEEE 802.1q VLAN tags are used, although other formats may also be suitable. In this example, a VLAN/IP address consistency check is performed at a subsystem in the IP stack where 802.1q tag information is present to control access. In this example, computing elements are configured with a VLAN capable network interface card (NIC) in a manner that allows the computing elements to be communicatively coupled to multiple VLANs simultaneously.

Figure 17:
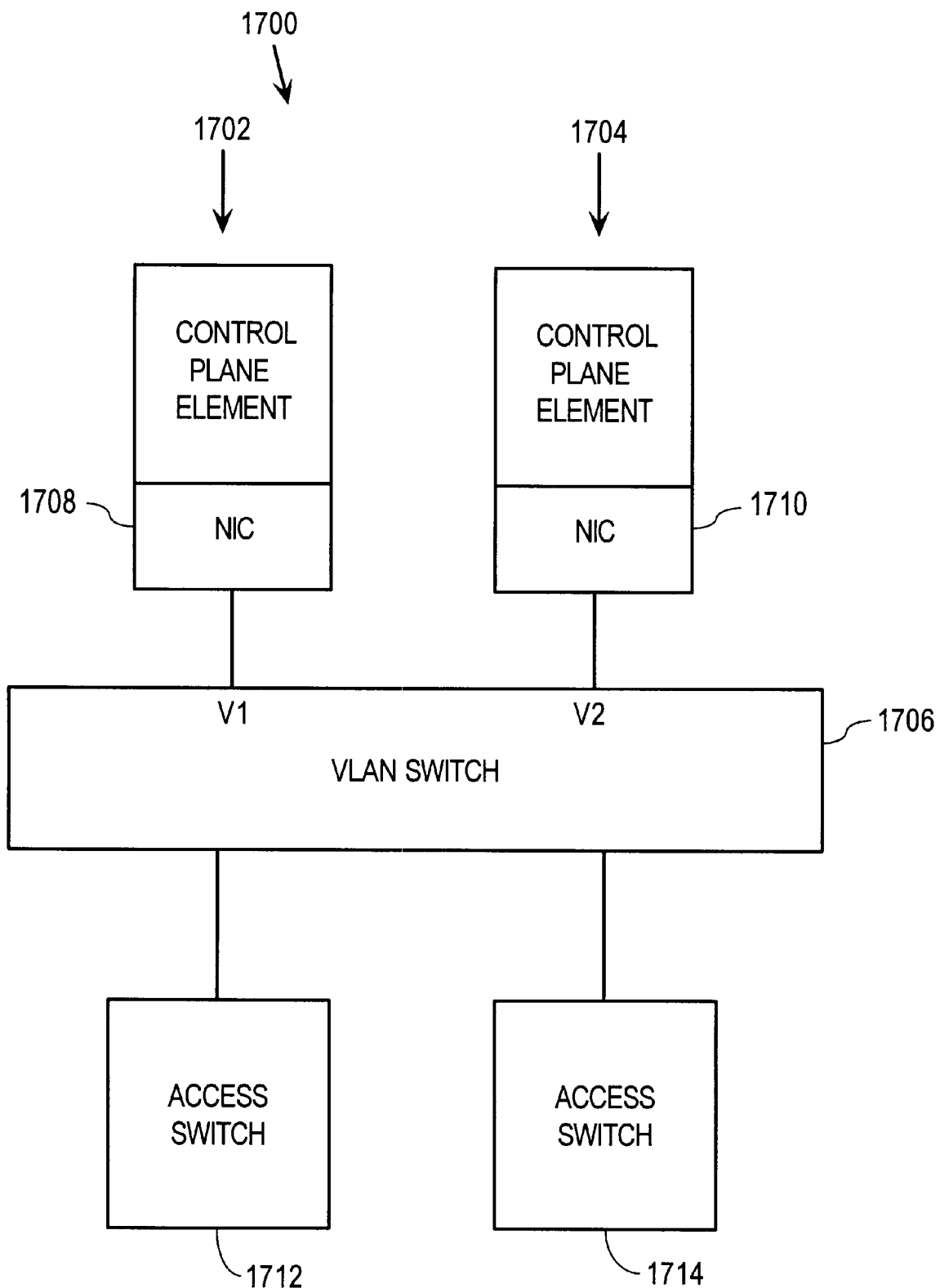
FIG. 17 is a block diagram of an arrangement for enforcing tight binding between VLAN tags and IP addresses.

FIG. 17 is a block diagram 1700 of an arrangement for enforcing tight binding between VLAN tags and IP addresses according to an embodiment. Computing elements 1702 and 1704 are communicatively coupled to ports v1 and v2 of a VLAN switch 1706 via NICs 1708 and 1710, respectively. VLAN switch 1706 is also communicatively coupled to access switches 1712 and 1714. Ports v1 and v2 are configured in tagged mode. According to one embodiment, IEEE 802.1q VLAN tag information is provided by VLAN switch 1706.

A WIDE AREA COMPUTING GRID

The VSF described above can be distributed over a WAN in several ways.

In one alternative, a wide area backbone may be based on Asynchronous Transfer Mode (ATM) switching. In this case, each local area VLAN is extended into a wide area using Emulated LANs (ELANs) which are part of the ATM LAN Emulation (LANE) standard. In this way, a single VSF can span across several wide area links, such as ATM/SONET/OC-12 links. An ELAN becomes part of a VLAN which extends across the ATM WAN.

Alternatively, a VSF is extended across a WAN using a VPN system. In this embodiment, the underlying characteristics of the network become irrelevant, and the VPN is used to interconnect two or more VSFs across the WAN to make a single distributed VSF.

Data mirroring technologies can be used in order to have local copies of the data in a distributed VSF. Alternatively, the SAN is bridged over the WAN using one of several SAN to WAN bridging techniques, such as SAN-to-ATM bridging or SAN-to-Gigabit Ethernet bridging. SANs constructed over IP networks naturally extend over the WAN since IP works well over such networks.

Figure 18:
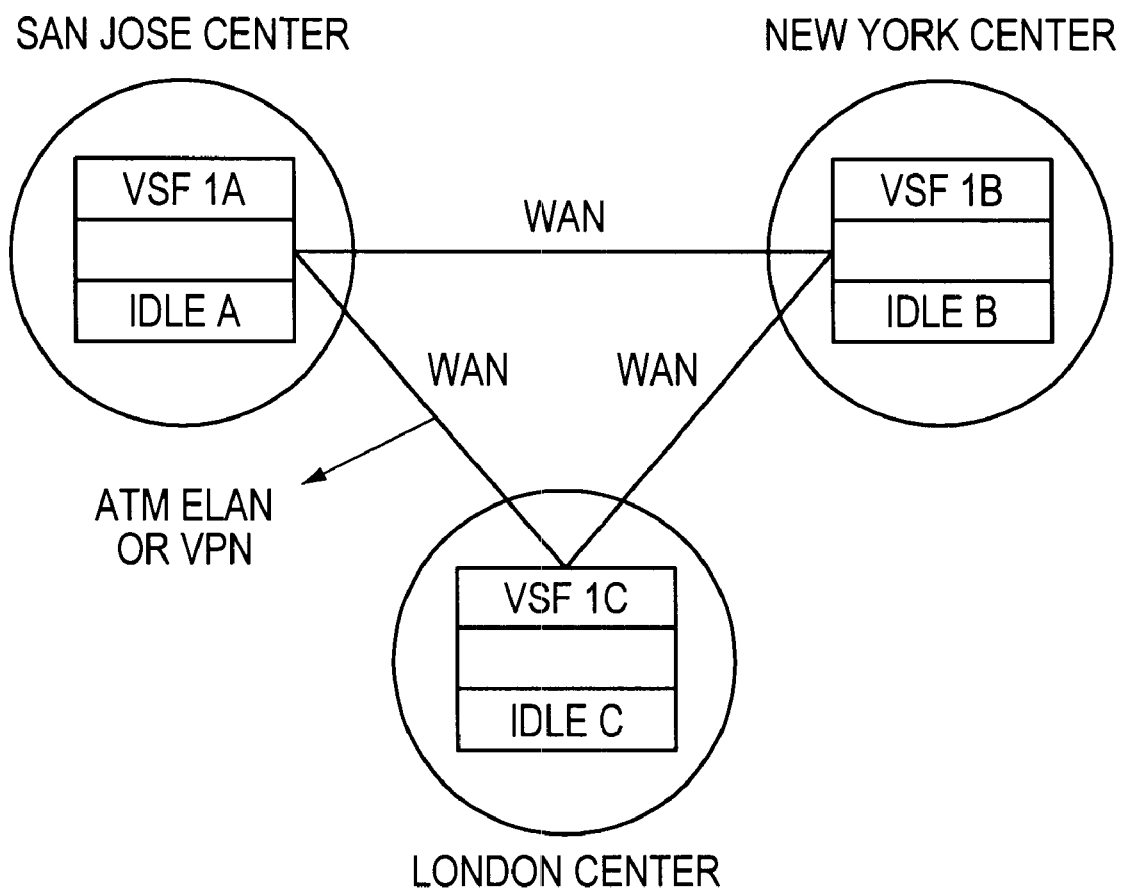
FIG. 18 is a block diagram of a plurality of VSFs extended over WAN connections.

FIG. 18 is a block diagram of a plurality of VSFs extended over WAN connections. A San Jose Center, New York Center, and London center are coupled by WAN connections. Each WAN connection comprises an ATM, ELAN, or VPN connection in the manner described above. Each center comprises at least one VSF and at least one Idle Pool. For example, the San Jose center has VSF1A and Idle Pool A. In this configuration, the computing resources of each Idle Pool of a center are available for allocation or assignment to a VSF located in any other center. When such allocation or assignment is carried out, a VSF becomes extended over the WAN.

EXAMPLE USES OF VSFS

The VSF architecture described in the examples above may be used in the context of Web server system. Thus, the foregoing examples have been described in terms of Web servers, application servers and database servers constructed out of the CPUs in a particular VSF. However, the VSF architecture may be used in many other computing contexts and to provide other kinds of services; it is not limited to Web server systems.

A DISTRIBUTED VSF AS PART OF A CONTENT DISTRIBUTION NETWORK

In one embodiment, a VSF provides a Content Distribution Network (CDN) using a wide area VSF. The CDN is a network of caching servers that performs distributed caching of data. The network of caching servers may be implemented, for example, using TrafficServer (TS) software commercially available from Inktomi Corporation, San Mateo, Calif. TS is a cluster aware system; the system scales as more CPUs are added to a set of caching Traffic Server computing elements. Accordingly, it is well suited to a system in which adding CPUs is the mechanism for scaling upwards.

In this configuration, a system can dynamically add more CPUs to that portion of a VSF that runs caching software such as TS, thereby growing the cache capacity at a point close to where bursty Web traffic is occurring. As a result, a CDN may be constructed that dynamically scales in CPU and I/O bandwidth in an adaptive way.

A VSF FOR HOSTED INTRANET APPLICATIONS

There is growing interest in offering Intranet applications such as Enterprise Resource Planning (ERP), ORM and CRM software as hosted and managed services. Technologies such as Citrix WinFrame and Citrix MetaFrame allow an enterprise to provide Microsoft Windows applications as a service on a thin client such as a Windows CE device or Web browser. A VSF can host such applications in a scalable manner.

For example, the SAP R/3 ERP software, commercially available from SAP Aktiengesellschaft of Germany, allows an enterprise to load balance using multiple Application and Database Servers. In the case of a VSF, an enterprise would dynamically add more Application Servers (e.g., SAP Dialog Servers) to a VSF in order to scale up the VSF based on real-time demand or other factors.

Similarly, Citrix Metaframe allows an enterprise to scale up Windows application users on a server farm running the hosted Windows applications by adding more Citrix servers. In this case, for a VSF, the Citrix MetaFrame VSF would dynamically add more Citrix servers in order to accommodate more users of Metaframe hosted Windows applications. It will be apparent that many other applications may be hosted in a manner similar to the illustrative examples described above.

CUSTOMER INTERACTION WITH A VSF

Since a VSF is created on demand, a VSF customer or organization that "owns" the VSF may interact with the system in various ways in order to customize a VSF. For example, because a VSF is created and modified instantly via the control plane, the VSF customer may be granted privileged access to create and modify its VSF itself. The privileged access may be provided using password authentication provided by Web pages and security applications, token card authentication, Kerberos exchange, or other appropriate security elements.

In one exemplary embodiment, a set of Web pages are served by the computing element, or by a separate server. The Web pages enable a customer to create a custom VSF, by specifying a number of tiers, the number of computing elements in a particular tier, the hardware and software platform used for each element, and things such as what kind of Web server, application server, or database server software should be pre-configured on these computing elements. Thus, the customer is provided with a virtual provisioning console.

After the customer or user enters such provisioning information, the control plane parses and evaluates the order and queues it for execution. Orders may be reviewed by human managers to ensure that they are appropriate. Credit checks of the enterprise may be run to ensure that it has appropriate credit to pay for the requested services. If the provisioning order is approved, the control plane may configure a VSF that matches the order, and return to the customer a password providing root access to one or more of the computing elements in the VSF. The customer may then upload master copies of applications to execute in the VSF.

When the enterprise that hosts the computing grid is a for-profit enterprise, the Web pages may also receive payment related information, such as a credit card, a PO number, electronic check, or other payment method.

In another embodiment, the Web pages enable the customer to choose one of several VSF service plans, such as automatic growth and shrinkage of a VSF between a minimum and maximum number of elements, based on real-time load. The customer may have a control value that allows the customer to change parameters such as minimum number of computing elements in a particular tier such as Web servers, or a time period in which the VSF must have a minimal amount of server capacity. The parameters may be linked to billing software that would automatically adjust the customer's bill rate and generate billing log file entries.

Through the privileged access mechanism the customer can obtain reports and monitor real-time information related to usage, load, hits or transactions per second, and adjust the characteristics of a VSF based on the real-time information.

It will be apparent that the foregoing features offer significant advantages over conventional manual approaches to constructing a server farm. In the conventional approaches, a user cannot automatically influence server farm's properties without going through a cumbersome manual procedure of adding servers and configuring the server farm in various ways.

BILLING MODELS FOR A VSF

Given the dynamic nature of a VSF, the enterprise that hosts the computing grid and VSFs may bill service fees to customers who own VSFs using a billing model for a VSF which is based on actual usage of the computing elements and storage elements of a VSF. It is not necessary to use a flat fee billing model. The VSF architecture and methods disclosed herein enable a "pay-as-you-go" billing model because the resources of a given VSF are not statically assigned. Accordingly, a particular customer having a highly variable usage load on its server farm could save money because it would not be billed a rate associated with constant peak server capacity, but rather, a rate that reflects a running average of usage, instantaneous usage, etc.

For example, an enterprise may operate using a billing model that stipulates a flat fee for a minimum number of computing elements, such as 10 servers, and stipulates that when real-time load requires more than 10 elements, then the user is billed at an incremental rate for the extra servers, based on how many extra servers were needed and for the length of time that they are needed. The units of such bills may reflect the resources that are billed. For example, bills may be expressed in units such as MIPS-hours, CPU-hours, thousands of CPU seconds, etc.

A CUSTOMER VISIBLE CONTROL PLANE API

In another alternative, the capacity of a VSF may be controlled by providing the customer with an application programing interface (API) that defines calls to the control plane for changing resources. Thus, an application program prepared by the customer could issue calls or requests using the API to ask for more servers, more storage, more bandwidth, etc. This alternative may be used when the customer needs the application program to be aware of the computing grid environment and to take advantage of the capabilities offered by the control plane.

Nothing in the above-disclosed architecture requires the customer to modify its application for use with the computing grid. Existing applications continue to work as they do in manually configured server farms. However, an application can take advantage of the dynamism possible in the computing grid, if it has a better understanding of the computing resources it needs based on the real-time load monitoring functions provided by the control plane. An API of the foregoing nature, which enables an application program to change the computing capacity of a server farm, is not possible using existing manual approaches to constructing a server farm.

AUTOMATIC UPDATING AND VERSIONING

Using the methods and mechanisms disclosed herein, the control plane may carry out automatic updating and versioning of operating system software that is executed in computing elements of a VSF. Thus, the end user or customer is not required to worry about updating the operating system with a new patch, bug fix, etc. The control plane can maintain a library of such software elements as they are received and automatically distribute and install them in computing elements of all affected VSFs.

IMPLEMENTATION MECHANISMS

The computing elements and control plane may be implemented in several forms and the invention is not limited to any particular form. In one embodiment, each computing element is a general purpose digital computer having the elements shown in FIG. 19 except for non-volatile storage device 1910, and the control plane is a general purpose digital computer of the type shown in FIG. 19 operating under control of program instructions that implement the processes described herein.

Figure 19:
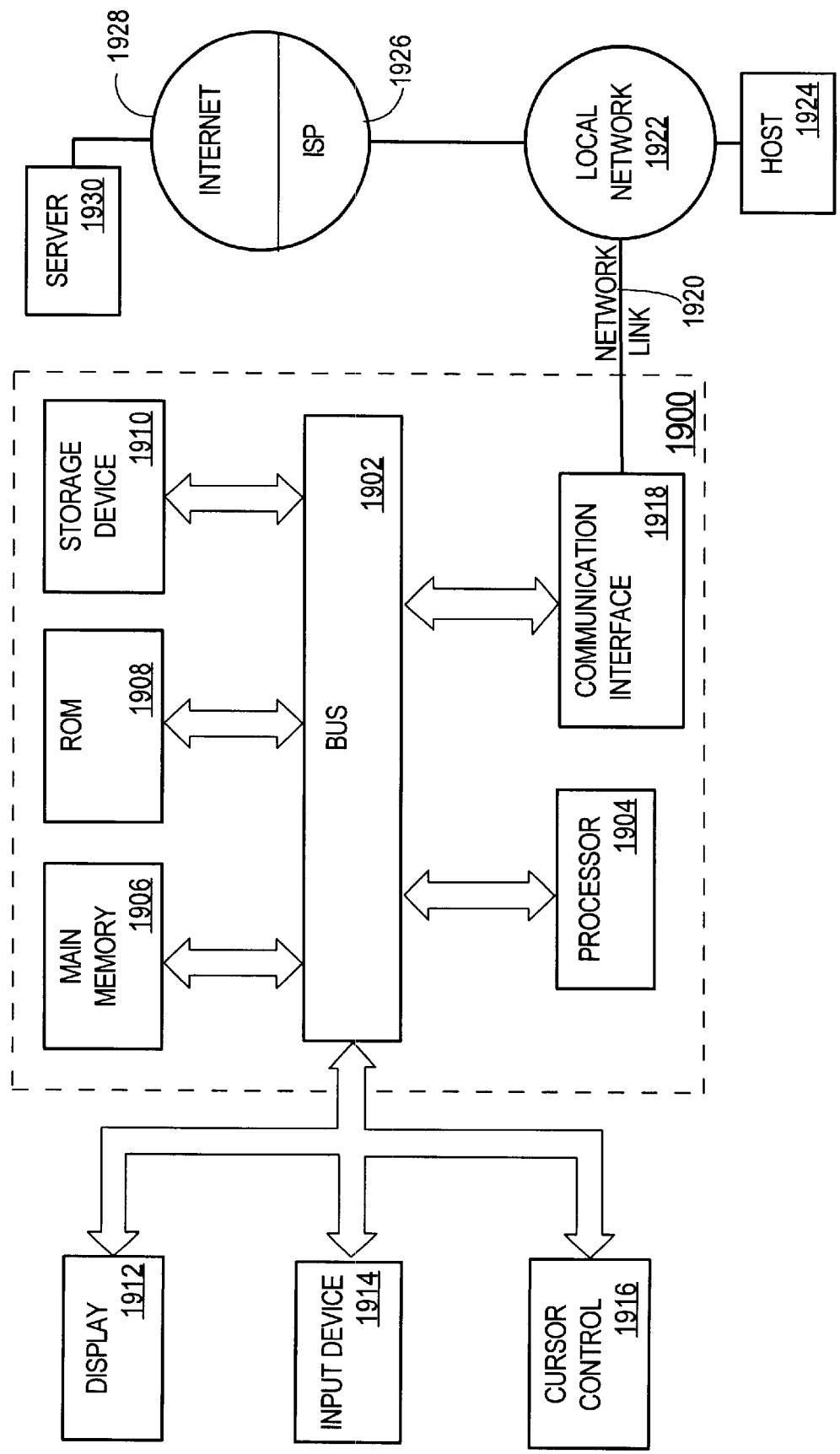
FIG. 19 is a block diagram of a computer system with which an embodiment may be implemented.

FIG. 19 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

The invention is related to the use of computer system 1900 for controlling an extensible computing system. According to one embodiment of the invention, controlling an extensible computing system is provided by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. One or more processors in a multi-processing arrangement may also be employed to execute the sequences of instructions contained in main memory 1906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1904 for execution. Such a medium may take many forms, including but not limited to, non-volatile media, volatile media, and transmission media. Non-volatile media includes, for example, optical or magnetic disks, such as storage device 1910. Volatile media includes dynamic memory, such as main memory 1906. Transmission media includes coaxial cables, copper wire and fiber optics, including the wires that comprise bus 1902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infrared transmitter to convert the data to an infrared signal. An infrared detector coupled to bus 1902 can receive the data carried in the infrared signal and place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the worldwide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. In accordance with the invention, one such downloaded application provides for controlling an extensible computing system as described herein.

The received code may be executed by processor 1904 as it is received, and/or stored in storage device 1910, or other non-volatile storage for later execution. In this manner, computer system 1900 may obtain application code in the form of a carrier wave.

The computing grid disclosed herein may be compared conceptually to the public electric power network that is sometimes called the power grid. The power grid provides a scalable means for many parties to obtain power services through a single-wide-scale power infrastructure. Similarly, the computing grid disclosed herein provides computing services to many organizations using a single wide-scale computing infrastructure. Using the power grid, power consumers do not independently manage their own personal power equipment. For example, there is no reason for a utility consumer to run a personal power generator at its facility, or in a shared facility and manage its capacity and growth on an individual basis. Instead, the power grid enables the wide-scale distribution of power to vast segments of the population, thereby providing great economies of scale. Similarly, the computing grid disclosed herein can provide computing services to vast segments of the population using a single wide-scale computing infrastructure.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A control apparatus comprising:

a master control mechanism; and one or more slave control mechanisms communicatively coupled to the master control mechanism and being configured to, in response to one or more instructions from the master control mechanism, establish a first logical that contains a first subset of processing resources and a first subset of storage resources and is capable of operating independent of the master control mechanism and the one or more slave control mechanisms, wherein the first logical computing entity is established by:

selecting the first subset of processing resources from a set of processing resources, selecting the first subset of storage resources from a set of storage resources, and causing the first subset of processing resources to be communicatively coupled to the first subset of storage resources.

2. A control apparatus as recited in claim 1, wherein the master control mechanism is a master control process executing on one or more processors and the one or more slave control mechanisms are one or more slave processes executing on the one or more processors.

3. A control apparatus as recited in claim 1, wherein the master control mechanism is one or more master processors and the one or more slave control mechanisms are one or more slave processors.

4. A control apparatus as recited in claim 1, wherein the master control mechanism is configured to, based upon slave control process mechanism loading, dynamically reassign control, between the one or more slave control mechanisms, of one or more processing resources from the subset of processing resources and one or more storage resources from the subset of storage resources.

5. A control apparatus as recited in claim 1, wherein the master control mechanism is configured to, based upon slave control process mechanism loading, dynamically allocate one or more additional slave control mechanisms, and assign control of one or more processing resources from the subset of processing resources and one or more storage resources from the subset of storage resources to the one or more additional slave control mechanisms.

6. A control apparatus as recited in claim 1, wherein the master control mechanism is configured to, based upon slave control process mechanism loading, reassign control to one or more other slave control mechanisms from the one or more slave control mechanisms of one or more particular processing resources from the subset of processing resources and one or more particular storage resources from the subset of storage resources that were previously assigned to one or more particular slave control mechanisms from the one or more slave control mechanisms, and dynamically de-allocate the one or more particular slave control mechanisms.

7. A control apparatus as recited in claim 1, wherein the master control mechanism is configured to:

determine a status of the one or more slave control mechanisms, if one or more particular slave control mechanisms from the one or more slave control mechanisms are not responding or functioning correctly, then attempting to restart the one or more particular slave control mechanisms, and if the one or more particular slave control mechanisms cannot be restarted, then initiating one or more new slave control mechanisms, and reassigning control of processing resources and storage resources from the one or more particular slave control mechanisms to the one or more new slave control mechanisms.

8. A control apparatus as recited in claim 1, wherein the one or more slave control mechanisms are configured to:

determine a status of the master control mechanism, and if the master control mechanism has failed or is no longer functioning properly, elect a new master control mechanism from the one or more slave control mechanisms.

9. A control apparatus as recited in claim 1, wherein the one or more instructions from the master control mechanism are generated based upon expected processing and storage requirements for the first logical computing entity.

10. A control apparatus as recited in claim 1, wherein the one or more slave control mechanisms are further configured to, in response to the one or more instructions from the master control mechanism, perform the following:

dynamically change the number of processing resources in the first subset of processing resources, dynamically change the number of storage resources in the first subset of storage resources, dynamically change the communicative coupling between the first subset of processing resources and the first subset of storage resources to reflect changes in the number of processing resources in the first subset of processing resources and the number of storage resources in the first subset of storage resources.

11. A control apparatus as recited in claim 1, wherein the one or more slave control mechanisms are further configured to, in response to the one or more instructions from the master control mechanism, establish a second logical computing entity that contains a second subset of processing resources and a second subset of storage resources and is capable of operating independent of the master control mechanism the one or more slave control mechanisms and the first logical computing entity, wherein the second logical computing entity is communicatively isolated from the first logical computing entity by:
   selecting the second subset of processing resources from the set of processing resources,
   selecting the second subset of storage resources from the set of processing resources, and
   causing the second subset of processing resources to be communicatively coupled to the second subset of storage resources.

12. A control apparatus as recited in claim 1, wherein:
   the master control mechanism is communicatively coupled to a central control mechanism,
   the master control mechanism is configured to provide loading information for the first logical computing entity to the central control mechanism, and
   the master control mechanism is further configured to generate the one or more instructions for the one or more slave control mechanisms based upon one or more central control instructions received from the central control mechanism.

13. A control apparatus as recited in claim 10, wherein changes to the number of processing resources in the first subset of processing resources and the number of storage resources in the first subset of storage resources is instructed by the master control mechanism based upon actual loading of the first subset of processing resources and first subset of storage resources.

14. A control apparatus as recited in claim 11, wherein:
   the first subset of processing resources is communicatively coupled to the first subset of storage resources using one or more storage area network (SAN) switches,
   the second subset of processing resources is communicatively coupled to the second subset of storage resources using the one or more SAN switches, and
   the second logical resource group is communicatively isolated from the first logical resource group using tagging and SAN zoning.

15. A control apparatus as recited in claim 14, wherein SAN zoning is performed using port-level SAN zoning or LUN level SAN zoning.

16. A method for managing processing resources comprising the steps of:
   initiating a master control mechanism; and
   initiating one or more slave control mechanisms communicatively coupled to the master control mechanism and being configured to, in response to one or more instructions from the master control mechanism, establish a first logical computing entity that contains a first subset of processing resources and a first subset of storage resources and is capable of operating independent of the master control mechanism and the one or more slave control mechanisms, wherein the first logical computing entity is established by:
   selecting the first subset of processing resources from a set of processing resources,
   selecting the first subset of storage resources from a set of storage resources, and
   causing the first subset of processing resources to be communicatively coupled to the first subset of storage resources.

17. A method as recited in claim 16, wherein:
   initiating a master control mechanism includes initiating a master control process executing on one or more processors, and
   initiating one or more slave control mechanisms includes initiating one or more slave processes executing on the one or more processors.

18. A method as recited in claim 16, wherein:
   initiating a master control mechanism includes initiating one or more master control processors, and
   initiating one or more slave control mechanisms includes initiating one or more slave processors.

19. A method as recited in claim 16, further comprising the master control mechanism dynamically reassigning control, based upon slave control process mechanism loading, between the one or more slave control mechanisms, of one or more processing resources from the subset of processing resources and one or more storage resources from the subset of storage resources.

20. A method as recited in claim 16, further comprising the master control mechanism, based upon slave control process mechanism loading,
   dynamically allocating one or more additional slave control mechanisms, and
   assigning control of one or more processing resources from the subset of processing resources and one or more storage resources from the subset of storage resources to the one or more additional slave control mechanisms.

21. A method as recited in claim 16, further comprising the master control mechanism, based upon slave control process mechanism loading,
   reassigning control to one or more other slave control mechanisms from the one or more slave control mechanisms of one or more particular processing resources from the subset of processing resources and one or more particular storage resources from the subset of storage resources that were previously assigned to one or more particular slave control mechanisms from the one or more slave control mechanisms, and
   dynamically de-allocating the one or more particular slave control mechanisms.

22. A method as recited in claim 16, further comprising the master control mechanism:
   determining a status of the one or more slave control mechanisms, if one or more particular slave control mechanisms from the one or more slave control mechanisms are not responding or functioning correctly, then
   attempting to restart the one or more particular slave control mechanisms, and if the one or more particular slave control mechanisms cannot be restarted, then
      initiating one or more new slave control mechanisms, and
      reassigning control of processing resources and storage resources from the one or more particular slave control mechanisms to the one or more new slave control mechanisms.

23. A method as recited in claim 16, further comprising the one or more slave control mechanisms:
   determining a status of the master control mechanism, and if the master control mechanism has failed or is no longer functioning properly, electing a new master control mechanism from the one or more slave control mechanisms.

24. A method as recited in claim 16, wherein the one or more instructions from the master control mechanism are generated based upon expected processing and storage requirements for the first logical computing entity.

25. A method as recited in claim 16, further comprising the one or more slave control mechanisms, in response to the one or more instructions from the master control mechanism, performing the following:
dynamically changing the number of processing resources in the first subset of processing resources,
dynamically changing the number of storage resources in the first subset of storage resources,
dynamically changing the communicative coupling between the first subset of processing resources and the first subset of storage resources to reflect changes in the number of processing resources in the first subset of processing resources and the number of storage resources in the first subset of storage resources.

26. A method as recited in claim 16, further comprising the one or more slave control mechanisms, in response to the one or more instructions from the master control mechanism, establishing a second logical computing entity that contains a second subset of processing resources and a second subset of storage resources and is capable of operating independent of the master control mechanism, the one or more slave control mechanisms and the first logical computing entity, wherein the second logical computing entity is communicatively isolated from the first logical computing entity, by:
selecting the second subset of processing resources from the set of processing resources,
selecting the second subset of storage resources from the set of processing resources, and
causing the second subset of processing resources to be communicatively coupled to the second subset of storage resources.

27. A method as recited in claim 16, wherein:
the master control mechanism is communicatively coupled to a central control mechanism,
the master control mechanism is configured to provide loading information for the first logical computing entity to the central control mechanism, and
the master control mechanism is further configured to generate the one or more instructions for the one or more slave control mechanisms based upon one or more central control instructions received from the central control mechanism.

28. A method as recited in claim 25, wherein changes to the number of processing resources in the first subset of processing resources and the number of storage resources in the first subset of storage resources is instructed by the master control mechanism based upon actual loading of the first subset of processing resources and first subset of storage resources.

29. A method as recited in claim 26, wherein:
the first subset of processing resources is communicatively coupled to the first subset of storage resources using one or more storage area network (SAN) switches,
the second subset of processing resources is communicatively coupled to the second subset of storage resources using the one or more SAN switches, and
the second logical resource group is communicatively isolated from the first logical resource group using tagging and SAN zoning.

30. A method as recited in claim 29, wherein SAN zoning is performed using port-level SAN zoning or LUN level SAN zoning.

31. A computer-readable medium carrying one or more sequences of one or more instructions for managing processing resources, wherein execution of the one or more sequences of one or more instructions by one or more processors causes the one or more processors to perform the steps of:
initiating a master control mechanism; and
initiating one or more slave control mechanisms communicatively coupled to the master control mechanism and being configured to, in response to one or more instructions from the master control mechanism, establish a first logical computing entity that contains a first subset of processing resources and a first subset of storage resources and is capable of operating independent of the master control mechanism and the one or more slave control mechanisms, wherein the first logical computing entity is established by:
selecting the first subset of processing resources from a set of processing resources,
selecting the first subset of storage resources from a set of storage resources, and
causing the first subset of processing resources to be communicatively coupled to the first subset of storage resources.

32. A computer-readable medium as recited in claim 31, wherein:
initiating a master control mechanism includes initiating a master control process executing on one or more processors, and
initiating one or more slave control mechanisms includes initiating one or more slave processes executing on the one or more processors.

33. A computer-readable medium as recited in claim 31, wherein:
initiating a master control mechanism includes initiating one or more master control processors, and
initiating one or more slave control mechanisms includes initiating one or more slave processors.

34. A computer-readable medium as recited in claim 31, further comprising one or more additional sequences of instructions which, when executed by the one or more processors, cause the master control mechanism to dynamically reassign control, based upon slave control process mechanism loading, between the one or more slave control mechanisms, of one or more processing resources from the subset of processing resources and one or more storage resources from the subset of storage resources.

35. A computer-readable medium as recited in claim 31, further comprising one or more additional sequences of instructions which, when executed by the one or more processors, cause the master control mechanism to, based upon slave control process mechanism loading,
dynamically allocate one or more additional slave control mechanisms, and assign control of one or more processing resources from the subset of processing resources and one or more storage resources from the subset of storage resources to the one or more additional slave control mechanisms.

36. A computer-readable medium as recited in claim 31, further comprising one or more additional sequences of instructions which, when executed by the one or more processors, cause the master control mechanism to, based upon slave control process mechanism loading, reassign control to one or more other slave control mechanisms from the one or more slave control mechanisms of one or more particular processing resources from the subset of processing resources and one or more particular storage resources from the subset of storage resources that were previously assigned to one or more particular slave control mechanisms from the one or more slave control mechanisms, and dynamically de-allocate the one or more particular slave control mechanisms.

37. A computer-readable medium as recited in claim 31, further comprising one or more additional sequences of instructions which, when executed by the one or more processors, cause the master control mechanism to:

determine a status of the one or more slave control mechanisms, and if one or more particular slave control mechanisms from the one or more slave control mechanisms are not responding or functioning correctly, then attempt to restart the one or more particular slave control mechanisms, and if the one or more particular slave control mechanisms cannot be restarted, then initiate one or more new slave control mechanisms, and reassign control of processing resources and storage resources from the one or more particular slave control mechanisms to the one or more new slave control mechanisms.

38. A computer-readable medium as recited in claim 31, further comprising one or more additional sequences of instructions which, when executed by the one or more processors, cause the one or more slave control mechanisms to:

determine a status of the master control mechanism, and if the master control mechanism has failed or is no longer functioning properly, elect a new master control mechanism from the one or more slave control mechanisms.

39. A computer-readable medium as recited in claim 31, wherein the one or more instructions from the master control mechanism are generated based upon expected processing and storage requirements for the first logical computing entity.

40. A computer-readable medium as recited in claim 31, further comprising one or more additional sequences of instructions which, when executed by the one or more processors, cause the one or more slave control mechanisms, in response to the one or more instructions from the master control mechanism, performing the following:

dynamically changing the number of processing resources in the first subset of processing resources, dynamically changing the number of storage resources in the first subset of storage resources, dynamically changing the communicative coupling between the first subset of processing resources and the first subset of storage resources to reflect changes in the number of processing resources in the first subset of processing resources and the number of storage resources in the first subset of storage resources.

41. A computer-readable medium as recited in claim 31, further comprising one or more additional sequences of instructions which, when executed by the one or more processors, cause the one or more slave control mechanisms to, in response to the one or more instructions from the master control mechanism, establish a second logical computing entity that contains a second subset of processing resources and a second subset of storage resources and is capable of operating independent of the master control mechanism, the one or more slave control mechanisms and the first logical computing entity, wherein the second logical computing entity is communicatively isolated from the first logical computing entity by:

selecting the second subset of processing resources from the set of processing resources, selecting the second subset of storage resources from the set of processing resources, and causing the second subset of processing resources to he communicatively coupled to the second subset of storage resources.

42. A computer-readable medium as recited in claim 31, wherein:

the master control mechanism is communicatively coupled to a central control mechanism, the master control mechanism is configured to provide loading information for the first logical computing entity to the central control mechanism, and the master control mechanism is further configured to generate the one or more instructions for the one or more slave control mechanisms based upon one or more central control instructions received from the central control mechanism.

43. A computer-readable medium as recited in claim 40, wherein changes to the number of processing resources in the first subset of processing resources and the number of storage resources in the first subset of storage resources is instructed by the master control mechanism based upon actual loading of the first subset of processing resources and first subset of storage resources.

44. A computer-readable medium as recited in claim 41, wherein:

the first subset of processing resources is communicatively coupled to the first subset of storage resources using one or more storage area network (SAN) switches, the second subset of processing resources is communicatively coupled to the second subset of storage resources using the one or more SAN switches, and the second logical resource group is communicatively isolated from the first logical resource group using tagging and SAN zoning.

45. A computer-readable medium as recited in claim 44, wherein SAN zoning is performed using port-level SAN zoning or LUN level SAN zoning.

* * * * *

UNITED STATES PATENT AND TRADEMARK OFFICE
CERTIFICATE OF CORRECTION

PATENT NO.     : 6,597,956 B1
DATED          : July 22, 2003
INVENTOR(S)    : Ashar Aziz et al.

It is certified that error appears in the above-identified patent and that said Letters Patent is hereby corrected as shown below:

<u>Column 27,</u>
Line 43, "logical that" should read -- logical computing entity that --.

Signed and Sealed this

Fifteenth Day of June, 2004

JON W. DUDAS
*Acting Director of the United States Patent and Trademark Office*